(12) United States Patent  (10) Patent No.: US 12,041,266 B2
Chen  (45) Date of Patent: Jul. 16, 2024

(54) ENCODING AND DECODING METHOD, APPARATUS AND DEVICE

(71) Applicant: HANGZHOU HIKVISION DIGITAL TECHNOLOGY CO., LTD., Hangzhou (CN)

(72) Inventor: Fangdong Chen, Hangzhou (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 301 days.

(21) Appl. No.: 17/595,780

(22) PCT Filed: Jun. 17, 2020

(86) PCT No.: PCT/CN2020/096649
§ 371 (c)(1),
(2) Date: Nov. 24, 2021

(87) PCT Pub. No.: WO2020/259372
PCT Pub. Date: Dec. 30, 2020

(65) Prior Publication Data
US 2022/0232248 A1    Jul. 21, 2022

(30) Foreign Application Priority Data
Jun. 24, 2019 (CN) .......................... 201910551169.9

(51) Int. Cl.
*H04N 19/577* (2014.01)
*H04N 19/119* (2014.01)
(Continued)

(52) U.S. Cl.
CPC ......... *H04N 19/577* (2014.11); *H04N 19/119* (2014.11); *H04N 19/137* (2014.11); *H04N 19/159* (2014.11); *H04N 19/176* (2014.11)

(58) Field of Classification Search
CPC .. H04N 19/577; H04N 19/119; H04N 19/137; H04N 19/159; H04N 19/176
See application file for complete search history.

(56) References Cited

U.S. PATENT DOCUMENTS 5,546,129 A * 8/1996 Lee .................. H04N 19/54
375/E7.11
5,646,691 A   7/1997 Yokoyama
(Continued)

FOREIGN PATENT DOCUMENTS

CN    1533181    9/2004
CN    102648631    8/2012
(Continued)

OTHER PUBLICATIONS

Chen et al., "Algorithm description for Versatile Video Coding and Test Model 5 (VTM 5)" *Joint Video Experts Team (JVET)*, 14th Meeting: Geneva, CH, Mar. 19-27, 2019.
(Continued)

*Primary Examiner* — Zaihan Jiang
(74) *Attorney, Agent, or Firm* — NORTON ROSE FULBRIGHT US LLP

(57) ABSTRACT

An encoding and decoding method, apparatus and device is disclosed. The method comprises: dividing, if characteristic information of a current block meets specific conditions, the current block into a first triangle sub-block and a second triangle sub-block; constructing a motion information list for the current block, the motion information list includes multiple pieces of candidate motion information; acquiring first target motion information of the first triangle sub-block and second target motion information of the second triangle sub-block from the motion information list; the first target motion information is different from the second target motion information; performing motion compensation on the first triangle sub-block based on the first target motion (Continued)

information to obtain a prediction value of the first triangle sub-block; performing motion compensation on the second triangle sub-block based on the second target motion information to obtain a prediction value of the second triangle sub-block.

13 Claims, 7 Drawing Sheets

(51) Int. Cl.
*H04N 19/137* (2014.01)
*H04N 19/159* (2014.01)
*H04N 19/176* (2014.01)

(56) References Cited

U.S. PATENT DOCUMENTS

| | | | |
|---|---|---|---|
| 9,426,487 B2 | 8/2016 | Zheng | |
| 11,689,735 B2* | 6/2023 | Deng | H04N 19/176 |
| | | | 375/240.16 |
| 2006/0193535 A1* | 8/2006 | Mishima | G06V 10/754 |
| | | | 382/294 |
| 2011/0200097 A1 | 8/2011 | Chen et al. | |
| 2020/0014948 A1* | 1/2020 | Lai | H04N 19/172 |
| 2020/0128266 A1* | 4/2020 | Xu | H04N 19/119 |
| 2020/0186799 A1* | 6/2020 | Wang | H04N 19/52 |
| 2020/0267406 A1* | 8/2020 | Chang | H04N 19/109 |
| 2020/0336735 A1* | 10/2020 | Chang | H04N 19/70 |
| 2021/0051335 A1* | 2/2021 | Liao | H04N 19/103 |
| 2021/0152825 A1* | 5/2021 | Reuze | H04N 19/119 |
| 2021/0321102 A1 | 10/2021 | Chen | |
| 2022/0303561 A1* | 9/2022 | Bossen | H04N 19/157 |
| 2023/0014915 A1* | 1/2023 | Zhang | H04N 19/132 |

FOREIGN PATENT DOCUMENTS

| | | |
|---|---|---|
| CN | 102763415 | 10/2012 |
| CN | 102884794 | 1/2013 |
| CN | 103561263 | 2/2014 |
| CN | 109510991 | 3/2019 |
| CN | 109819255 | 5/2019 |
| EP | 2464116 | 6/2012 |
| EP | 3886437 | 9/2021 |
| EP | 3989573 | 4/2022 |
| JP | 2004289284 | 10/2004 |
| JP | 2022515507 | 2/2022 |
| KR | 20110047814 | 5/2011 |
| KR | 20190046704 | 5/2019 |
| KR | 20210093347 | 7/2021 |
| RU | 2603537 | 11/2016 |
| WO | WO 2012/120870 | 9/2012 |
| WO | WO2012120582 | 9/2012 |
| WO | WO-2019/039324 * | 8/2018 |
| WO | WO 2019/039322 | 2/2019 |
| WO | WO2019079611 | 4/2019 |
| WO | WO 2020/073896 | 4/2020 |
| WO | WO 2020/142447 | 7/2020 |

OTHER PUBLICATIONS

International Search Report and Written Opinion issued in Corresponding PCT Application No. PCT/CN2020/096649, dated Sep. 2, 2020 (English Translation provided.).
Office Action issued in corresponding Japanese Application No. 2021-570200, dated Jan. 24, 2023 (English machine translation provided).
Office Action issued in counterpart Russian Patent Application No. 2021137589, dated Nov. 29, 2022, 10 pages (English translation provided).
Bross et al., "Versatile Video Coding (Draft 5)." Mar. 19-27, 2019, 14th Meeting: Geneva, CH, Joint Video Experts Team (JVET), doc. JVET-N1001-v8, 3 pages.
Chiang et al., "CE10-related: Syntax redundancy removal in triangle prediction." Jan. 9-18, 2019, 13th Meeting: Marrakech, MA, Joint Video Experts Team (JVET), doc. JVET-M0185-v1, Jan. 2, 2019.
Liao et al., "CE10.3.1.b: Triangular prediction unit mode." Oct. 3-12, 2018, 12th Meeting: Macao, CN, Joint Video Experts Team (JVET), doc. JVET-L0124-v2, Nov. 15, 2018.
Park et al., "CE10-related: Simplification of triangular partitions." Jan. 9-18, 2019, 13th Meeting: Marrakech, MA, Joint Video Experts Team (JVET), doc. JVET-M0352-v3, Jan. 6, 2019.
Solovyev et al., "Non-CE4: Simplifications for triangular prediction mode." Jan. 9-18, 2019, 13th Meeting: Marrakech, MA, Joint Video Experts Team (JVET), doc. JVET-M0286-v2, Jan. 12, 2019.
Wang et al., "CE10-related: Using regular merge index signaling for triangle mode" Jan. 9-18, 2019, 13th Meeting: Marrakech, MA, Joint Video Experts Team (JVET), doc. JVET-M0883, Jan. 14, 2019.
Wang et al., "CE4-related: An improved method for triangle merge list construction." Mar. 19-27, 2019, 14th Meeting: Geneva, CH, Joint Video Experts Team (JVET), doc. JVET-N0340, Mar. 13, 2019.
Yan et al., "Diagonal motion partitions for inter prediction in HEVC," *2016 Visual Communications and Image Processing (VCIP)*, IEEE Xplore 2016, pp. 1-4, doi: 10.1109/VCIP.2016.7805575.
Yuan et al., "A New Transform Structure for Geometry Motion Partitioning in Video Coding" *Journal of Shanghai University (Natural Science)* 2013, 19(3), 240-244 (English Abstract).

* cited by examiner

| Index value | Unidirectional motion information corresponding to list 0 | Unidirectional motion information corresponding to list 1 |
|---|---|---|
| 0 | × | |
| 1 | | × |
| 2 | × | |
| 3 | | × |
| 4 | × | |
FIG. 7A
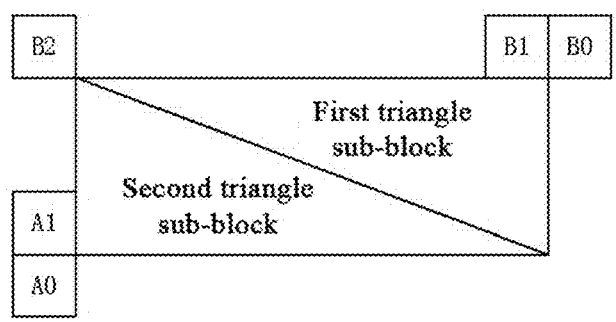
FIG. 7B
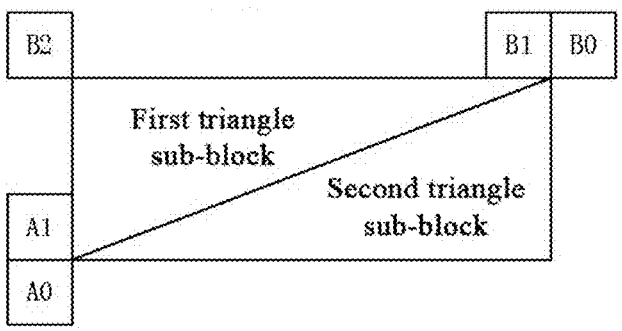
FIG. 7C

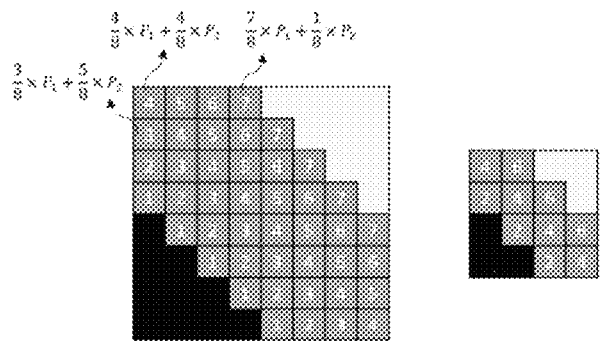
FIG. 7D
| 1 | 2 | 3 | 4 |
|---|---|---|---|
| 5 | 6 | 7 | 8 |
| 9 | 10 | 11 | 12 |
| 13 | 14 | 15 | 16 |
FIG. 7E
| 1 | 2 | 3 | 4 |
|---|---|---|---|
| 5 | 6 | 7 | 8 |
| 9 | 10 | 11 | 12 |
| 13 | 14 | 15 | 16 |
FIG. 7F
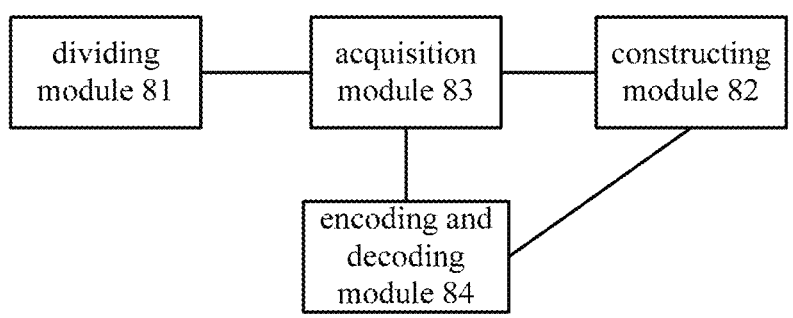
FIG. 8

ENCODING AND DECODING METHOD, APPARATUS AND DEVICE

CROSS-REFERENCE TO RELATED APPLICATIONS

This application is a national phase application under 35 U.S.C. § 371 of International Application No. PCT/CN2020/096649 filed Jun. 17, 2020, which claims the benefit of priority of Chinese Patent Application No. 201910551169.9 filed Jun. 24, 2019, which are hereby incorporated by reference in their entirety.

TECHNICAL FIELD

The present application relates to the technical field of encoding and decoding, and in particular to an encoding and decoding method, apparatus and device.

BACKGROUND

In order to save space, video images are transmitted after being encoded. A complete video encoding method may include processes such as prediction, transformation, quantization, entropy encoding, filtering, and the like. The predictive encoding may include intra encoding and inter encoding. Furthermore, inter encoding may use pixels of adjacent coded image to predict the current pixel by using the correlation in the video time domain, so as to effectively remove redundancy in the video time domain. Intra encoding may use pixels of the coded block in the current slice of image to predict the current pixel by using the correlation in the video time domain, so as to effectively remove redundancy in the video time domain.

In inter encoding, a motion vector may be used to represent the relative displacement between a current block of a current slice of image and a reference block of a reference frame image. For example, an image A of a current slice and an image B of a reference frame have a strong temporal correlation. When the current block of the image A is to be transmitted, a motion search may be performed in the image B to find a reference block B1 that best matches with the current block A1, and a relative displacement between the current block A1 and the reference block B1 may be determined, which is the motion vector of the current block A1.

In some examples, the current block is a rectangle. However, and the edges of an actual object may generally not be absolutely horizontal and vertical. For a current block at the edge of the object, there may be two different objects (such as an object at the foreground and a background). In this case, if the current rectangular block is predicted by using a single prediction mode, there would be problems such as poor prediction effect, large coding residuals, and poor coding performance, and the like.

SUMMARY

The present application provides an encoding and decoding method and device, which can improve encoding performance.

An embodiment of the present application provides a decoding method, comprising:
  acquiring first target motion information and second target motion information; wherein the first target motion information is target motion information of a first sub-block divided from a current block, and the second target motion information is target motion information of a second sub-block divided from the current block; wherein the first sub-block and the second sub-block are two triangle sub-blocks divided from the current block according to a partition line;
  determining a first area, a second area and a third area included in the current block based on the first sub-block and the second sub-block divided according to the partition line, wherein the first area is located in the first sub-block, the second area is located in the second sub-block, the partition line is located in the third area, and there is an overlapping area between the third area and the first sub-block and there is an overlapping area between the third area and the second sub-block; and
  storing motion information of the current block, wherein if the first target motion information and the second target motion information are derived from a same reference frame list, the second target motion information is stored as target motion information of the third area.

Optionally, the motion information is stored in a unit of a 4*4 block.

Optionally, if the first target motion information and the second target motion information are derived from different reference frame lists, the first target motion information and the second target motion information are merged into bidirectional motion information, which then is stored as the target motion information of the third area.

Optionally, a sub-block in the first area is a sub-block on which non-weighted prediction compensation is performed, and the first target motion information is stored as the target motion information of the sub-block in the first area; a sub-block in the second area is a sub-block on which non-weighted prediction compensation is performed, and the second target motion information is stored as the target motion information of the sub-block in the second area.

Optionally, after determining a first area, a second area, and a third area included in a current block based on the first sub-block and the second sub-block divided according to the partition line, the method further comprises:
  performing motion compensation on each sub-block in the first area based on the first target motion information, to obtain a prediction value of each sub-block in the first area;
  performing motion compensation on each sub-block in the second area based on the second target motion information, to obtain a prediction value of each sub-block in the second area;
  performing weighted motion compensation on each sub-block in the third area based on the first target motion information and the second target motion information, to obtain a prediction value of each sub-block in the third area;
  determining a prediction value of the current block based on the prediction value of each sub-block in the first area, the prediction value of each sub-block in the second area, and the prediction value of each sub-block in the third area.

Optionally, performing weighted motion compensation on each sub-block in the third area based on the first target motion information and the second target motion information, to obtain a prediction value of each sub-block in the third area comprises:
  for each sub-block in the third area, determining a first prediction value of the sub-block based on the first target motion information, and determining a second prediction value of the sub-block based on the second target motion information;

performing weighted motion compensation on the sub-block based on the first prediction value, a first weight coefficient corresponding to the first prediction value, the second prediction value, a second weight coefficient corresponding to the second prediction value, to obtain the prediction value of the sub-block.

Optionally, if the sub-block in the third area is located in the first sub-block, the first weight coefficient corresponding to the first prediction value of the sub-block is greater than the second weight coefficient corresponding to the second prediction value of the sub-block;

if the sub-block in the third area is located in the second sub-block, the first weight coefficient corresponding to the first prediction value of the sub-block is smaller than the second weight coefficient corresponding to the second prediction value of the sub-block;

if the sub-block in the third area is located across the partition line, the first weight coefficient corresponding to the first prediction value of the sub-block is equal to the second weight coefficient corresponding to the second prediction value of the sub-block.

Optionally, acquiring first target motion information and second target motion information comprises:

constructing a motion information list for the current block, wherein the motion information list includes multiple pieces of candidate motion information;

acquiring first target motion information of the first sub-block and the second target motion information of the second sub-block from the motion information list.

Optionally, the first target motion information is different from the second target motion information.

Optionally, acquiring first target motion information and second target motion information comprises:

constructing a motion information list for the current block, wherein the motion information list includes multiple pieces of candidate motion information;

selecting one piece of candidate motion information corresponding to the first index value from the motion information list based on a first index value indicated by indication information, and determining the candidate motion information as the first target motion information;

selecting another piece of candidate motion information corresponding to the second index value from the motion information list based on a second index value indicated by indication information, and determining this candidate motion information as the second target motion information.

Optionally, the steps in the above method are performed when a motion information mode of the current block, size information of the current block, a slice type of a current slice and sequence-level switch control information of the current block meet specific conditions; wherein the motion information mode of the current block meeting the specific condition comprises that the motion information mode of the current block is a merge mode, and the motion information mode of the current block is not a regular merge mode, a sub-block-based merge mode or a combined inter-picture merge and intra-picture prediction mode; and wherein the slice type of the current slice meeting the specific condition comprises that the current slice where the current block is located is a B slice.

Optionally, if the first prediction value is P1, the second prediction value is P2, the first weight coefficient is a, the second weight coefficient is b, then a prediction value after weighted motion compensation of the sub-block is P1*a+P2*b; a value set of the first weight coefficient is {7/8, 6/8, 5/8, 4/8, 3/8, 2/8, 1/8}, and a sum of the first weight coefficient and the second weight coefficient is 1.

Optionally, each sub-block in the third area comprises a luma component, and the set of weight coefficients for the brightness component is {7/8, 6/8, 5/8, 4/8, 3/8, 2/8, 1/8};

for any one brightness component, the first prediction value is a brightness prediction value determined based on the first target motion information, the second prediction value is a brightness prediction value determined based on the second target motion information, the prediction value after weighted motion compensation of the sub-block is a brightness prediction value after weighted motion compensation determined based on the first prediction value, the second prediction value, the first weight coefficient and the second weight coefficient.

Optionally, each sub-block in the third area comprises a chroma component, for the chroma component, the first prediction value is a chroma prediction value determined based on the first target motion information, the second prediction value is a chroma prediction value determined based on the second target motion information, the prediction value after weighted motion compensation of the sub-block is a chroma prediction value after weighted motion compensation determined based on the first prediction value, the second prediction value, the first weight coefficient and the second weight coefficient.

Optionally, the two triangle sub-blocks are two triangle sub-blocks divided from the current block according to a partition method indicated by indication information.

An embodiment of the present application further provides a decoding apparatus, comprising:

a module configured for acquiring first target motion information and second target motion information; wherein the first target motion information is target motion information of a first sub-block divided from a current block, and the second target motion information is target motion information of a second sub-block divided from the current block; wherein the first sub-block and the second sub-block are two triangle sub-blocks divided from the current block according to a partition line;

a module configured for determining a first area, a second area and a third area included in the current block based on the first sub-block and the second sub-block divided according to the partition line, wherein the first area is located in the first sub-block, the second area is located in the second sub-block, the partition line is located in the third area, and there is an overlapping area between the third area and the first sub-block and there is an overlapping area between the third area and the second sub-block; and a module configured for storing motion information of the current block, wherein if the first target motion information and the second target motion information are derived from a same reference frame list, the second target motion information is stored as target motion information of the third area.

Optionally, the motion information is stored in a unit of a 4*4 block.

Optionally, if the first target motion information and the second target motion information are derived from different reference frame lists, the first target motion information and the second target motion information are merged into bidirectional motion information, which then is stored as the target motion information of the third area.

Optionally, a sub-block in the first area is a sub-block on which non-weighted prediction compensation is performed, and the first target motion information is stored as the target motion information of the sub-block in the first area; a sub-block in the second area is a sub-block on which non-weighted prediction compensation is performed, and the second target motion information is stored as the target motion information of the sub-block in the second area.

Optionally, the apparatus is further configured for:
performing motion compensation on each sub-block in the first area based on the first target motion information, to obtain a prediction value of each sub-block in the first area;
performing motion compensation on each sub-block in the second area based on the second target motion information, to obtain a prediction value of each sub-block in the second area;
performing weighted motion compensation on each sub-block in the third area based on the first target motion information and the second target motion information, to obtain a prediction value of each sub-block in the third area;
determining a prediction value of the current block based on the prediction value of each sub-block in the first area, the prediction value of each sub-block in the second area, and the prediction value of each sub-block in the third area.

Optionally, performing weighted motion compensation on each sub-block in the third area based on the first target motion information and the second target motion information, to obtain a prediction value of each sub-block in the third area comprises:
for each sub-block in the third area, determining a first prediction value of the sub-block based on the first target motion information, and determining a second prediction value of the sub-block based on the second target motion information;
performing weighted motion compensation on the sub-block based on the first prediction value, a first weight coefficient corresponding to the first prediction value, the second prediction value, a second weight coefficient corresponding to the second prediction value, to obtain the prediction value of the sub-block.

An embodiment of the present application further provides an decoding device, comprising: a processor and a machine-readable storage medium, wherein the machine-readable storage medium stores machine executable instructions that are able to be executed by the processor. The processor is configured to execute the machine executable instructions to implement any method described above.

An embodiment of the present application further provides an electronic device, comprising a processor and a memory for storing processor executable instructions. Wherein the processor is configured to implement any method described above.

An embodiment of the present application further provides a non-transitory storage medium on which instructions are stored, wherein the instructions implement the method according to any method described above when being executed by a processor.

The present application provides an encoding and decoding method, the method includes:
dividing, if characteristic information of a current block meets specific conditions, the current block into a first triangle sub-block and a second triangle sub-block;
constructing a motion information list for the current block, wherein the motion information list includes multiple pieces of candidate motion information;
acquiring first target motion information of the first triangle sub-block and the second target motion information of the second triangle sub-block from the motion information list, wherein the first target motion information is different with the second target motion information; performing motion compensation on the first triangle sub-block based on the first target motion information, to obtain a prediction value of the first triangle sub-block; and performing motion compensation on the second triangle sub-block based on the second target motion information, to obtain a prediction value of the second triangle sub-block.

The present application provides an encoding and decoding apparatus, the apparatus includes: a dividing module, configured for dividing, if characteristic information of a current block meets specific conditions, the current block into a first triangle sub-block and a second triangle sub-block; a constructing module, configured for constructing a motion information list for the current block, wherein the motion information list includes multiple pieces of candidate motion information; an acquisition module, configured for acquiring first target motion information of the first triangle sub-block and the second target motion information of the second triangle sub-block from the motion information list, wherein the first target motion information is different with the second target motion information; and an encoding and decoding module, configured for performing motion compensation on a first triangle sub-block based on the first target motion information to obtain a prediction value of the first triangle sub-block; performing motion compensation on a second triangle sub-block based on the second target motion information to obtain a prediction value of the second triangle sub-block.

The present application provides an encoding device, the device includes: a processor and a machine-readable storage medium, the machine-readable storage medium stores machine-executable instructions that can be executed by the processor; the processor is configured for executing the machine-executable instructions to implement the following steps: dividing, if characteristic information of a current block meets specific conditions, the current block into a first triangle sub-block and a second triangle sub-block; constructing a motion information list for the current block, wherein the motion information list includes multiple pieces of candidate motion information; acquiring first target motion information of the first triangle sub-block and the second target motion information of the second triangle sub-block from the motion information list, wherein the first target motion information is different with the second target motion information; performing motion compensation on the first triangle sub-block based on the first target motion information, to obtain a prediction value of the first triangle sub-block; and performing motion compensation on the second triangle sub-block based on the second target motion information, to obtain a prediction value of the second triangle sub-block.

The present application provides a decoding device, the device includes: a processor and a machine-readable storage medium, the machine-readable storage medium stores machine-executable instructions that can be executed by the processor; the processor is configured for executing the machine-executable instructions to implement the following steps: dividing, if characteristic information of a current block meets specific conditions, the current block into a first triangle sub-block and a second triangle sub-block; constructing a motion information list for the current block, wherein the motion information list includes multiple pieces of candidate motion information; acquiring first target motion information of the first triangle sub-block and the second target motion information of the second triangle sub-block from the motion information list, wherein the first target motion information is different with the second target motion information; performing motion compensation on the first triangle sub-block based on the first target motion information, to obtain a prediction value of the first triangle sub-block; and performing motion compensation on the second triangle sub-block based on the second target motion information, to obtain a prediction value of the second triangle sub-block.

It can be seen from the above solutions that in the embodiment of the present application, dividing, if characteristic information of a current block meets specific conditions, the current block into a first triangle sub-block and a second triangle sub-block; acquiring first target motion information of the first triangle sub-block and second target motion information of the second triangle sub-block from the motion information list; performing motion compensation on the first triangle sub-block based on the first target motion information to obtain a prediction value of the first triangle sub-block; performing motion compensation on the second triangle sub-block based on the second target motion information to obtain a prediction value of the second triangle sub-block. The above method can improve the prediction accuracy, improve the prediction performance, improve the coding performance and reduce the coding residuals.

BRIEF DESCRIPTION OF THE DRAWINGS

In order to more clearly describe the technical solution of the embodiments of the application, drawings needed in the embodiments of the present application will be briefly described below. Obviously, the drawings described below are for only some embodiments of the present application, and those skilled in the art can obtain other drawings according to drawings herein without any creative efforts.

FIG. 7A schematically illustrates a correspondence between index values and unidirectional motion information according to an embodiment of the present application;

FIGS. 7B-7C schematically illustrate dividing of triangle sub-blocks according to an embodiment of the present application;

FIG. 7D is a schematic diagram of motion compensation according to an embodiment of the present application;

FIGS. 7E-7F are schematic diagrams of motion information storage according to an embodiment of the present application;

FIG. 8 is a structural diagram of an encoding and decoding apparatus according to an embodiment of the present application;

DETAILED DESCRIPTION

Figure 1:
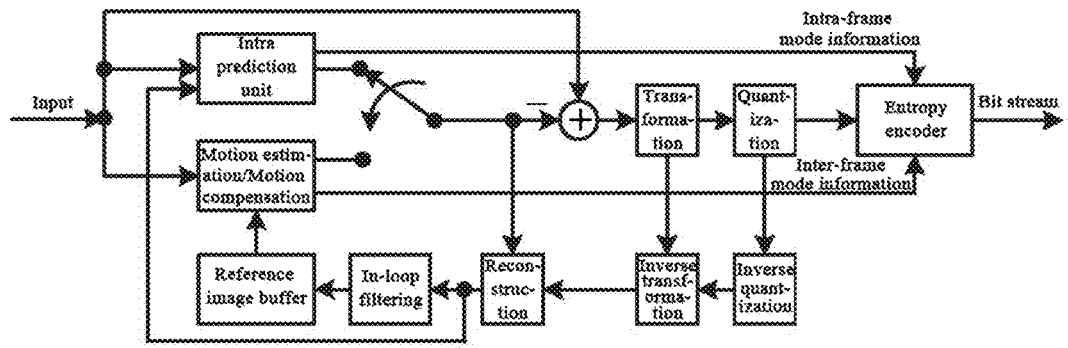
FIG. 1 is a schematic diagram of a video encoding framework according to an embodiment of the present application.

The terms used in the embodiments of the present application are only for the purpose of describing specific embodiments, rather than limiting various embodiments of the present application. The singular forms of "a", "said" and "the" used in the present application and claims are also intended to include plural forms, unless the context clearly indicates other meanings. It should also be understood that the term "and/or" as used herein refers to any or all possible combinations of one or more associated listed items. It should be understood that although the terms first, second, third, etc. may be used in the embodiments of the present application to describe various information, the information should not be limited to these terms. These terms are only used to distinguish the same type of information from each other. For example, without departing from the scope of the present application, first information may also be referred to as second information, and similarly, the second information may also be referred to as first information. Depending on the context, in addition, the used word "if" can be interpreted as "when", or "when", or "in response to determination".

The embodiments of the present application proposes an encoding and decoding method, apparatus, and device, which may involve the following concepts.

Intra prediction and inter prediction technology: intra prediction refers to predicting a current pixel by using pixels in the encoded block of a current image based on the correlation of the video spatial domain in order to remove redundancy in the video spatial domain; inter prediction refers to predicting pixels in a current image by using pixels in adjacent encoded images based on the correlation of a video time domain since a video sequence contains a strong time domain correlation, in order to effectively remove redundancy in the video time domain. The inter prediction part of a video encoding standard basically adopts block-based motion compensation technology. The principle is to find a best matching block, for each pixel block of the current image, in a previously encoded image. This process is referred to as Motion Estimation (ME).

Motion Vector (MV): in inter encoding, a motion vector may be used to represent a relative displacement between a current encoding block and a best matching block in a reference image of the current encoding block. Each divided block has a corresponding motion vector to be transmitted to a decoding end. Independently encoding and transmitting a motion vector of each block, particularly when the divided block has a small size, may require a considerable amount of bits to be consumed. In order to reduce the number of bits for encoding the motion vector, the spatial correlation between adjacent image blocks may be used to predict the motion vector of a current block to be encoded based on the motion vectors of the adjacent coded blocks, and then the prediction difference may be encoded. In this way, the number of bits representing the motion vector can be effectively reduced. In the process of encoding the motion vector of the current block, first, the motion vectors of adjacent encoded blocks are used to predict the motion vector of the current block, and then, the motion vector difference (MVD) value between the motion vector prediction (MVP) value and the true estimation value of the motion vector is encoded, thereby effectively reducing the number of encoding bits of MV.

Motion Information: since the motion vector represents the position offset between a current image block and a certain reference image block, in order to accurately acquire information related to the image block, in addition to the motion vector, index information of a reference frame image is also used to indicate which reference frame image is to be used. In video encoding technology, a reference frame image list may usually be established for a current slice image, and reference frame image index information indicates which reference frame image in the reference frame image list is adopted by the current image block. In addition, many encoding technologies also support multiple reference image lists. Therefore, an index value may also be used to indicate which reference image list is used, the index value may be called a reference direction. In video encoding technology, information related to motion such as motion vector, reference frame index, reference direction, and the like may be collectively referred to as motion information.

Rate-Distortion Optimization: two indicators for evaluating encoding efficiency are code rate and PSNR (Peak Signal to Noise Ratio). The smaller the bit stream, the greater the compression rate, and the greater the PSNR, the better the quality of the reconstructed image. In a mode selection, a discriminant formula is essentially a comprehensive evaluation of the two indicators. For example, the cost corresponding to a mode: $J(mode)=D+\lambda*R$, where D represents the distortion, which may usually be measured by a SSE indicator. SSE refers to a sum of the mean square of the difference between the reconstructed image block and the source image; $\lambda$ is the Lagrangian multiplier; and R is the actual number of bits required for image block encoding in this mode, including the sum of the number of bits required for encoding mode information, motion information, residuals, etc.

Video encoding framework: as shown in FIG. 1, a video encoding framework may be used to implement the encoding end processing flow according to the embodiment of the present application. In addition, a schematic diagram of a video decoding framework is similar to that of FIG. 1, which will not be repeated here, and the video decoding framework may be used to realize the decoding end processing flow according to the embodiment of the present application. Specifically, the video encoding frame and the video decoding frame may include modules such as intra prediction, motion estimation/motion compensation, reference image buffer, in-loop filtering, reconstruction, transformation, quantization, inverse transformation, inverse quantization, entropy encoder, etc. At the encoding end, the encoding end processing flow may be realized through the cooperation between these modules. At the decoding end, the decoding end processing flow may be realized through the cooperation between these modules.

Flag coding: in video coding, there are many modes, such as Merge mode, geometric partitioning mode with triangular partition, etc. For a certain block, a certain mode may be adopted. In order to indicate which mode is adopted, each block needs to be marked by encoding a corresponding flag bit. In other words, in the encoding end, the value of the flag bit may be determined, and then the flag bit may be encoded and transmitted to the decoding end. At the decoding end, it is determined whether a corresponding mode is enabled by parsing the flag bit.

Merge mode: the merge mode may include, but is not limited to, a regular merge mode, a geometric partitioning mode with triangular partition (also known as TPM mode), merge mode with MVD (also known as MMVD mode), sub-block-based merge mode (also known as SB Merge mode), and combined inter-picture merge and intra-picture prediction mode (also known as CIIP mode). If the current block enables the merge mode, one of the above five merge modes may be used.

Skip mode: the skip mode is a special merge mode, which is different from the merge mode in that, the skip mode does not require encoding residuals. If the current block adopts the skip mode, the CIIP mode is turned off by default; however the regular merge mode, geometric partitioning mode with triangular partition, merge with MVD, and the sub-block-based merge mode are still applicable.

It should be noted that a prediction value can be generated based on regular merge mode, TPM mode, MMVD mode, SB Merge mode, CIIP mode, etc. After the prediction value is generated, for the Merge mode, the prediction value and residual value can be used to obtain a reconstructed value; for the skip mode, there is no residual value, and the prediction value is directly used to obtain the reconstructed value.

Slice type: if the current slice cannot be encoded with reference to the information of other frames, the current slice may be an I slice; if the current slice is allowed to be encoded with reference to information of a certain other frame (but no more than 1 frame), the current slice may be a P slice; if the current slice is allowed to be encoded with reference to information of a certain 1 slice or 2 slices, the current slice may be a B slice.

Sequence parameter set (SPS): in a sequence parameter set, there are flag bits that determine whether certain tool switches are allowed in the entire sequence. If a flag bit is 1, a tool corresponding to the flag bit is allowed to be enabled in the video sequence; if a flag bit is 0, the tool corresponding to the flag bit is not allowed to be enabled in the video sequence.

Context-Based Adaptive Binary Arithmetic Coding (CABAC): CABAC is a commonly used entropy coding/decoding method, which includes two modes, i.e., a CABAC mode that stores and updates at least one context model, and a bypass CABAC mode that does not store and update the context model.

Currently, the current block is a rectangle, and the edges of an actual object may not be absolutely horizontal and vertical. For a current block at an edge of an object, there may be two different objects (such as an object at the foreground and a background) at the same time. In this case, if the current block is predicted by using a single prediction mode, there are problems such as poor prediction effect, large coding residuals, and poor coding performance, and the like.

In order to solve the above problems, an embodiment of the present application provides a geometric partitioning mode with triangular partition, in which a current block may be divided into two triangle sub-blocks that have different target motion information, thereby improving the friendliness of hardware implementation and improving the encoding performance. The encoding and decoding method in the embodiments of the present application will be described in detail below in conjunction with several specific embodiments.

Figure 2:
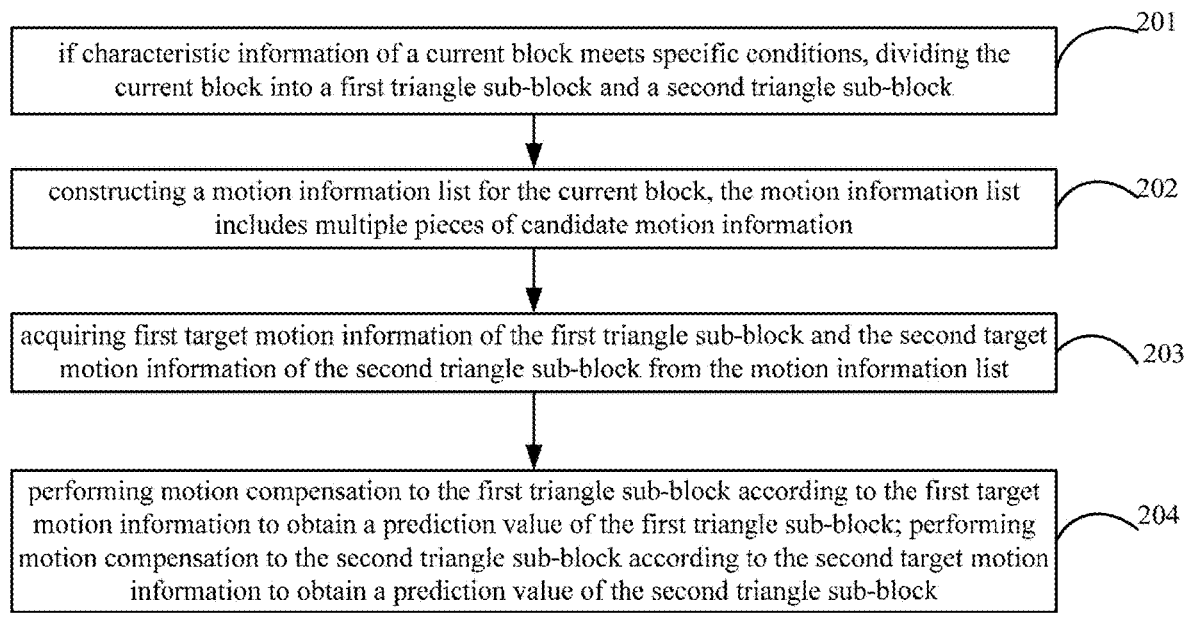
FIG. 2 is a flow diagram of an encoding and decoding method according to an embodiment of the present application.

Embodiment 1: FIG. 2 is a schematic flow diagram of an encoding and decoding method according to an embodiment of the present application. The encoding and decoding method may be applied to a decoding end or a encoding end, and may include:

step 201: if characteristic information of a current block meets specific conditions, dividing the current block into a first triangle sub-block and a second triangle sub-block; that is, the decoding end/encoding end may divide the current block into two triangle sub-blocks.

In an example, the characteristic information may include, but is not limited to, one or more of the followings: motion information mode, size information, slice type, sequence-level switch control information. Of course, the above are just a few examples, and there is no limitation on this.

If the characteristic information includes a motion information mode, and the motion information mode meets at least one of the following conditions, it is determined that the motion information mode meets specific conditions: the motion information mode of the current block is the merge mode or the skip mode; the motion information mode of the current block is the merge mode or the skip mode, and the motion information mode of the current block is not any of other types of merge sub-mode or skip sub-mode except the triangle prediction sub-mode; the motion information mode of the current block is the merge mode, and the motion information mode of the current block is not any one sub-mode of the regular merge sub-mode (also known as a regular merge mode), the MMVD sub-mode (merge mode with MVD), the SB merge sub-mode (the sub-block-based merge mode), CIIP sub-mode (combined inter-picture merge and intra-picture prediction mode); the motion information mode of the current block is the skip mode, and the motion information mode of the current block is not any one sub-mode of the regular merge sub-mode, MMVD sub-mode, SB merge sub-mode. Of course, the above are just a few examples, to which the present invention are not limited. The above examples may be used to determine whether the motion information mode of the current block is the geometric partitioning mode with triangular partition. When the motion information mode of the current block is determined to be the geometric partitioning mode with triangular partition, it is determined that the motion information mode meets specific conditions. For ease of description, in the present application, the TPM mode and the triangle prediction sub-mode can be used interchangeably, the regular merge mode and the regular merge sub-mode can be used interchangeably, the merge mode with MVD mode and the MMVD sub-mode can be used interchangeably, the sub-block-based merge mode and the SB merge sub-mode can be used interchangeably, and the CIIP mode and the CIIP sub-mode can be used interchangeably.

If the characteristic information includes a slice type, and the slice type meets at least one of the following conditions, it is determined that the slice type meets specific conditions: the slice type indicates that the current slice where the current block is located is a B slice; the slice type indicates that the current slice where the current block is located allows intra block copying.

If the characteristic information includes sequence-level switch control information, and the sequence-level switch control information allows the current block to use the geometric partitioning mode with triangular partition, it is determined that the sequence-level switch control information meets specific conditions.

If the characteristic information includes size information, and the size information includes at least one of a width value, a height value, and an area value, when the at least one of a width value, a height value, and an area value in the size information satisfies a corresponding threshold condition, the size information meets specific conditions. In an example, when the size information meets at least one of the following conditions, it is determined that the size information meets specific conditions: 1. the width value of the current block is greater than or equal to the first threshold, and the width value of the current block is less than or equal to the second threshold; 2. the height value of the current block is greater than or equal to the third threshold, and the height value of the current block is less than or equal to the fourth threshold; 3. the area value of the current block is greater than or equal to the fifth threshold, and the area value of the current block is less than or equal to the sixth threshold; 4. the area value of the current block is greater than or equal to the seventh threshold; 5. the area value of the current block is less than or equal to the eighth threshold; 6. the width value of the current block is less than or equal to the ninth threshold, and the height value of the current block is less than or equal to the tenth threshold. Of course, the above are just a few examples, and there is no limitation on this. In an example, each of the above threshold conditions can be configured based on experience, and there is no limitation on this.

In an example, the characteristic information includes one or more of motion information mode, size information, slice type, and sequence-level switch control information. When the characteristic information includes a motion information mode and the motion information mode meets specific conditions, it can indicate that the characteristic information meets specific conditions; when the characteristic information includes a slice type and the slice type meets specific conditions, it can indicate that the characteristic information meets specific conditions, and so on. When the characteristic information includes at least two of the motion information mode, size information, slice type, and sequence-level switch control information, the motion information mode and the slice type are taken as examples, and when the motion information mode meets the specific conditions and the slice type meets the specific conditions, it can indicate that the characteristic information meets the specific conditions, and so on.

In an example, at least one specific condition for each type of characteristic information (such as motion information mode, size information, slice type, sequence-level switch control information, etc.) may be arbitrarily combined with at least one specific condition of another type of characteristic information, thereby forming the specific conditions of the current block, there is no restriction on this combination mode and can be set arbitrarily.

In an example, if the encoding and decoding method is applied to the decoding end, the decoding end divides the current block into the first triangle sub-block and the second triangle sub-block, which may include but is not limited to: acquiring first indication information from an encoded bit stream, the first indication information is used to indicate division information of the triangle sub-blocks; if the division information of the triangle sub-block relates to a leading diagonal division method, the current block is divided into the first triangle sub-block and the second triangle sub-block according to the leading diagonal of the current block; if the division information of the triangle sub-block relates to a sub diagonal division method, the current block is divided into the first triangle sub-block and the second triangle sub-block according to the sub diagonal of the current block.

In an example, the first indication information may be obtained through bypass-based binary arithmetic decoding; or, the first indication information may be obtained through a context-based adaptive binary arithmetic decoding that is performed based on context model.

In an example, the CABAC includes two modes: a CABAC mode that stores and updates at least one context model (that is, the adaptive binary arithmetic encoding of the context), and a bypass CABAC mode that does not store and update the context model (that is, the bypassed mode binary arithmetic encoding). Therefore, the bypass-based binary arithmetic is one type of CABAC mode, while the context-based adaptive binary arithmetic based on context model is another type of CABAC mode.

At step 202, constructing a motion information list for the current block, the motion information list includes multiple pieces of candidate motion information.

In an example, a motion information list building method of the regular merge mode can be reused to construct the motion information list for the current block. For example, the motion information list building method of the regular merge mode is determined first, and then a motion information list for the current block is constructed based on the motion information list building method of the regular merge mode, and the motion information list includes multiple pieces of candidate motion information.

At step 203, acquiring first target motion information of the first triangle sub-block and the second target motion information of the second triangle sub-block from the motion information list; in an example, the first target motion information and the second target motion information may be different with each other.

If the encoding and decoding method is applied to a decoding end, the decoding end acquires first target motion information of a first triangle sub-block and second target motion information of a second triangle sub-block from the motion information list, which may include, but is not limited to: the decoding end acquiring the second indication information from the encoded bit steam, and the second indication information is used to indicate a first index value of the first target motion information in the motion information list, a second index value of the second target motion information in the motion information list. Based on the second indication information, the decoding end acquires candidate information corresponding to the first index value from the motion information list, and determines the candidate information corresponding to the first index value as first target motion information of the first triangle sub-block; based on the second indicating information, the decoding end acquires candidate information corresponding to the second index value from the motion information list, and determines the candidate information corresponding to the second index value as second target motion information of the second triangle sub-block.

In an example, the first index value is obtained through bypass-based binary arithmetic decoding; or, the first index value is obtained through a context-based adaptive binary arithmetic decoding that is performed based on context model. The second index value is obtained through bypass-based binary arithmetic decoding; or, the second index value is obtained through a context-based adaptive binary arithmetic decoding that is performed based on context model.

In an example, the first index value includes M1 binary bits, N1 binary bits in the M1 binary bits are obtained through the context-based adaptive binary arithmetic decoding that is performed based on context model, the remaining (M1−N1) binary bits in M1 binary bits are obtained through the bypass-based binary arithmetic decoding; M1 is a positive integer greater than or equal to 1, N1 is a positive integer greater than or equal to 1, M1 is greater than or equal to N1. For example, the first index value includes four binary bits, the first binary bit is obtained through the context-based adaptive binary arithmetic decoding that is performed based on context model, the second, third, fourth binary bits are obtained through the bypass-based binary arithmetic decoding. For example, the first index value includes two binary bits, the first binary bit is obtained through the context-based adaptive binary arithmetic decoding that is performed based on context model.

In an example, the second index value includes M2 binary bits, N2 binary bits in the M2 binary bits are obtained through the context-based adaptive binary arithmetic decoding that is performed based on context model, the remaining (M2−N2) binary bits in M2 binary bits are obtained through the bypass-based binary arithmetic decoding; M2 is a positive integer greater than or equal to 1, N2 is a positive integer greater than or equal to 1, M2 is greater than or equal to N2. For example, the second index value includes four binary bits, the first binary bit is obtained through the context-based adaptive binary arithmetic decoding that is performed based on context model, the second, third, fourth binary bits are obtained through the bypass-based binary arithmetic decoding. For example, the second index value includes one binary bits, the first binary bit is obtained through the context-based adaptive binary arithmetic decoding that is performed based on context model.

In an example, a context model corresponding to the first index value is the same as a context model corresponding to the second index value. Alternatively, a context model corresponding to the first index value is different with a context model corresponding to the second index value. Alternatively, a context model corresponding to the first index value and the first division information is the same as a context model corresponding to the second index value and the first division information; a context model corresponding to the first index value and the second division information is the same as a context model corresponding to the second index value and the second division information; a context model corresponding to the first index value and the first division information is different with a context model corresponding to the first index value and the second division information. Alternatively, a context model corresponding to the first index value and the first division information, a context model corresponding to the second index value and the first division information, a context model corresponding to the first index value and the second division information, and a context model corresponding to the second index value and the second division information are different with each other. The first division information indicates that the division information of the triangle sub-blocks relates to a leading diagonal division method; the second division information indicates that the division information of the triangle sub-blocks relates to a sub-diagonal division method.

In an example, acquiring candidate motion information corresponding to the first index value from the motion information list, and determining the acquired candidate motion information corresponding to first index value as first target motion information of the first triangle sub-block may include but not limited to: if the first index value is an even number and the candidate motion information corresponding to the first index value includes unidirectional motion information corresponding to list0, the unidirectional motion information corresponding to list0 is determined as the first target motion information of the first triangle sub-block; if the first index value is an even number and the candidate motion information corresponding to the first index value does not include unidirectional motion information corresponding to list0, the unidirectional motion information corresponding to the list1 is determined as the first target motion information of the first triangle sub-block; if the first index value is an odd number and the candidate motion information corresponding to the first index value includes unidirectional motion information corresponding to the list1, the unidirectional motion information corresponding to the list1 is determined as the first target motion information of the first triangle sub-block; if the first index value is an odd number, and the candidate motion information corresponding to the first index value does not include unidirectional motion information corresponding to list1, the unidirectional motion information corresponding to list0 is determined as the first target motion information of the first triangle sub-block.

In an example, acquiring candidate motion information corresponding to the second index value from the motion information list, and determining the acquired candidate motion information corresponding to the second index value as second target motion information of the second triangle sub-block may include but not limited to: if the second index value is an even number and the candidate motion information corresponding to the second index value includes unidirectional motion information corresponding to list0, the unidirectional motion information corresponding to list0 is determined as the second target motion information of the second triangle sub-block; if the first index value is an even number and the candidate motion information corresponding to the second index value does not include unidirectional motion information corresponding to list0, the unidirectional motion information corresponding to the list1 is determined as the second target motion information of the second triangle sub-block; if the second index value is an odd number and the candidate motion information corresponding to the second index value includes unidirectional motion information corresponding to the list1, the unidirectional motion information corresponding to the list1 is determined as the second target motion information of the second triangle sub-block; if the second index value is an odd number and the candidate motion information corresponding to the second index value does not include unidirectional motion information corresponding to list1, the unidirectional motion information corresponding to list0 is determined as the second target motion information of the second triangle sub-block.

In an example, acquiring candidate motion information corresponding to the first index value from the motion information list, and determining the acquired candidate motion information corresponding to the first index value as the first target motion information of the first triangle sub-block may include but not limited to: if the first index value is an odd number and the candidate motion information corresponding to the first index value includes unidirectional motion information corresponding to list0, the unidirectional motion information corresponding to list0 is determined as the first target motion information of the first triangle sub-block; if the first index value is an odd number and the candidate motion information corresponding to the first index value does not include unidirectional motion information corresponding to list0, the unidirectional motion information corresponding to the list1 is determined as the first target motion information of the first triangle sub-block; if the first index value is an even number and the candidate motion information corresponding to the first index value includes unidirectional motion information corresponding to the list1, the unidirectional motion information corresponding to the list1 is determined as the first target motion information of the first triangle sub-block; if the first index value is an even number and the candidate motion information corresponding to the first index value does not include unidirectional motion information corresponding to list1, the unidirectional motion information corresponding to list0 is determined as the first target motion information of the first triangle sub-block.

In an example, acquiring candidate motion information corresponding to the second index value from the motion information list, and determining the acquired candidate motion information corresponding to the second index value as the second target motion information of the second triangle sub-block may include but not limited to: if the second index value is an odd number, and the candidate motion information corresponding to the second index value includes unidirectional motion information corresponding to list0, the unidirectional motion information corresponding to list0 is determined as the second target motion information of the second triangle sub-block; if the first index value is an odd number, and the candidate motion information corresponding to the second index value does not include unidirectional motion information corresponding to list0, the unidirectional motion information corresponding to the list1 is determined as the second target motion information of the second triangle sub-block; if the second index value is an even number, and the candidate motion information corresponding to the second index value includes unidirectional motion information corresponding to the list1, the unidirectional motion information corresponding to the list1 is determined as the second target motion information of the second triangle sub-block; if the second index value is an even number, and the candidate motion information corresponding to the second index value does not include unidirectional motion information corresponding to list1, the unidirectional motion information corresponding to list0 is determined as the second target motion information of the second triangle sub-block.

In the above examples, when the slice type of the current slice where the current block is located is a B slice, the B slice allows the existence of inter-blocks pointing to multiple lists (reference frame lists) at the same time, such as an inter prediction block pointing to list0 and an inter prediction block pointing to list1. Therefore, when the current slice where the current slice is located is a B slice, the reference frame configuration of the current slice where the current block is located may include two reference frame lists, which may be list0 and list1. The candidate motion information may be unidirectional motion information, and the unidirectional motion information is unidirectional motion information corresponding to list0 or unidirectional motion information corresponding to list1; or, the candidate motion information may be bidirectional motion information, and the bidirectional motion information includes unidirectional motion information corresponding to list0 and unidirectional motion information corresponding to list1.

In an example, the decoding end may also acquire a first candidate set and a second candidate set. The first candidate set includes parts of candidate motion information in the motion information list, the second candidate set includes parts of candidate motion information in the motion information list, and the candidate motion information in the first candidate set is not exactly the same as the candidate motion information in the second candidate set. Then, the decoding end acquires candidate motion information corresponding to the first index value from the first candidate set, and determines the acquired candidate motion information corresponding to the first index value as the first target motion information of the first triangle sub-block. The decoding end acquires candidate motion information corresponding to the second index value from the second candidate set, and determines the acquired candidate motion information corresponding to the second index value as the second target motion information of the second triangle sub-block.

At step 204, performing motion compensation to the first triangle sub-block based on the first target motion information to obtain a prediction value of the first triangle sub-block; performing motion compensation to the second triangle sub-block based on the second target motion information to obtain a prediction value of the second triangle sub-block.

In an example, after obtaining the first target motion information of the first triangle sub-block and the second target motion information of the second triangle sub-block, the first target motion information is stored for the sub-block in the first triangle sub-block, on which non-weighted prediction compensation is performed; the second target motion information is stored for the sub-block in the second triangle sub-block, on which non-weighted prediction compensation is performed; the first target motion information, the second target motion information or the bidirectional motion information is stored for the sub-block, on which weighted prediction compensation is performed, is stored.

Storing the first target motion information, the second target motion information, or the bidirectional motion information for the sub-block, on which weighted prediction compensation is performed may include, but is not limited to any one of the followings: storing the first target motion information for the sub-block, storing the second target motion information for the sub-block, storing the first target motion information or the second target motion information for the sub-block according to the position of the sub-block, storing the first target motion information or the second target motion information for the sub-block according to the division direction of the current block, or, storing the first target motion information or the second target motion information for the sub-block according to the position of the sub-block and the division direction of the current block.

Storing the first target motion information, the second target motion information or the bidirectional motion information for the sub-block, on which weighted prediction compensation is performed may include, but is not limited to: if the first target motion information and the second target motion information are derived from different lists, the first target motion information and the second target motion information are combined into bidirectional motion information, and the bidirectional motion information is stored for the sub-block. Alternatively, if the first target motion information and the second target motion information are derived from the same list, the first target motion information is stored for the sub-block, or the second target motion information is stored for the sub-block.

In an example, if the first target motion information and the second target motion information are derived from the same list, storing the first target motion information for the sub-block or storing the second target motion information for the sub-block may include, but is not limited to any one of the followings: storing the first target motion information for the sub-block; storing the second target motion information for the sub-block; storing the first target motion information or the second target motion information for the sub-block according to the position of the sub-block; storing the first target motion information or the second target motion information for the sub-block according to the division direction of the current block; storing the first target motion information or the second target motion information for the sub-block according to the position of the sub-block and the division direction of the current block; storing a mean value of the first target motion information and the second target motion information for the sub-block; or, storing the first target motion information or the second target motion information for the sub-block based on the size information of the current block.

It can be seen from the above solutions that in the embodiment of the present application, if characteristic information of a current block meets specific conditions, the current block is divided into a first triangle sub-block and a second triangle sub-block; first target motion information of the first triangle sub-block and second target motion information of the second triangle sub-block are acquired from the motion information list; motion compensation is performed on the first triangle sub-block based on the first target motion information to obtain a prediction value of the first triangle sub-block; motion compensation is performed on the second triangle sub-block based on the second target motion information to obtain a prediction value of the second triangle sub-block. The above method can improve the prediction accuracy, improve the prediction performance, improve the coding performance and reduce the coding residuals.

Figure 3:
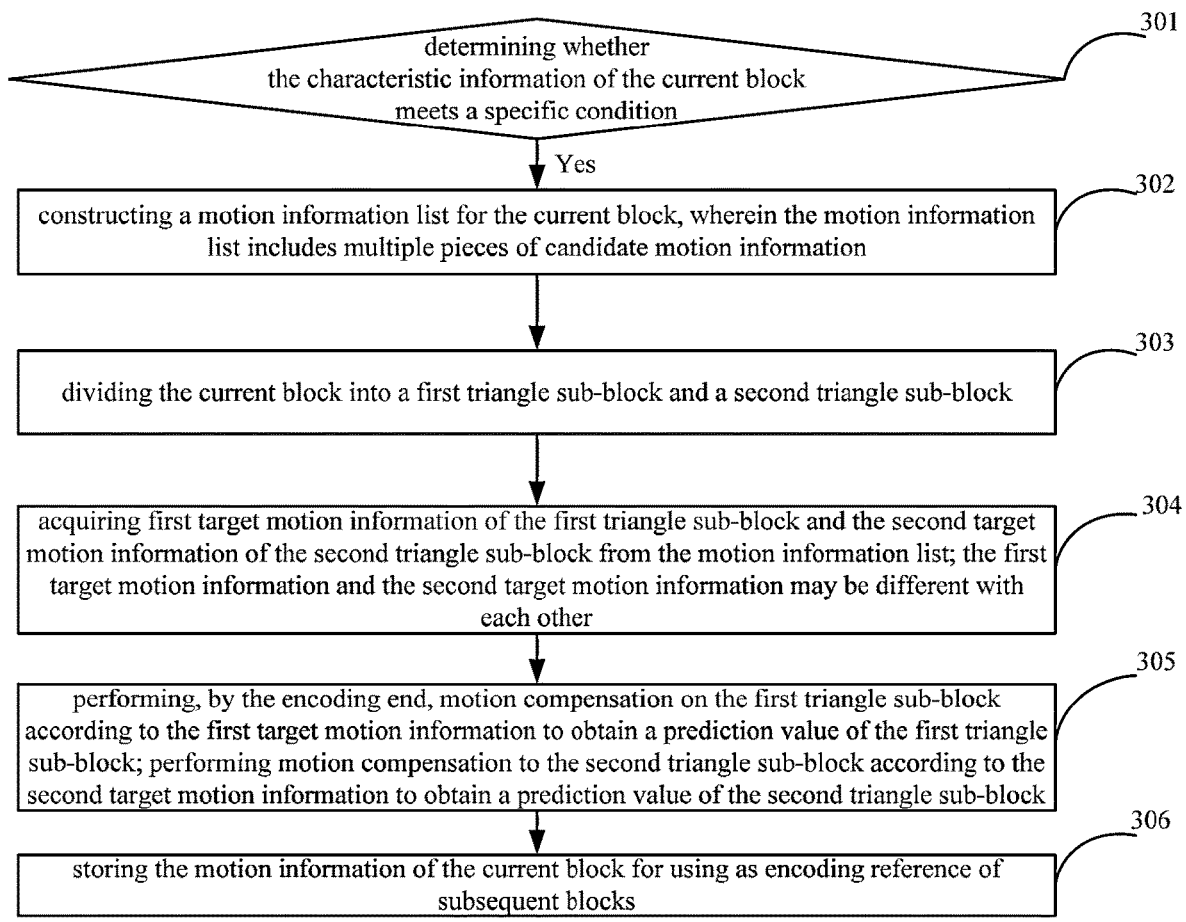
FIG. 3 is a flow diagram of an encoding method according to an embodiment of the present application.

Embodiment 2: similar with the invention conception as described above, an embodiment of the present application provides an encoding method, which may be applied to an encoding end. FIG. 3 is a schematic flow diagram of the method. The method may include:

At step 301, determining, by the encoding end, whether the characteristic information of the current block meets specific conditions; if yes, enabling the geometric partitioning mode with triangular partition and executing step 302; if not, not enabling the geometric partitioning mode with triangular partition, and no longer implementing the technical solution of this embodiment.

At step 302, constructing, by the encoding end, a motion information list for the current block, wherein the motion information list includes multiple pieces of candidate motion information.

At step 303, dividing, by the encoding end, the current block into a first triangle sub-block and a second triangle sub-block. For example, the current block is divided into a first triangle sub-block and a second triangle sub-block according to the leading diagonal (included angle of 45 degrees from the horizontal right direction); or, the current block is divided into a first triangle sub-block and a second triangle sub-block according to the sub-diagonal (included angle of 135 degrees from the horizontal right direction).

At step 304, acquiring, by the encoding end, first target motion information of the first triangle sub-block and the second target motion information of the second triangle sub-block from the motion information list; the first target motion information and the second target motion information may be different with each other.

At step 305, performing, by the encoding end, motion compensation on the first triangle sub-block based on the first target motion information to obtain a prediction value of the first triangle sub-block; performing motion compensation to the second triangle sub-block based on the second target motion information to obtain a prediction value of the second triangle sub-block. The prediction value of the first triangle sub-block and the prediction value of the second triangle sub-block are the prediction value of the current block.

At step 306, storing, by the encoding end, the motion information of the current block for using as encoding reference of subsequent blocks.

Figure 4:
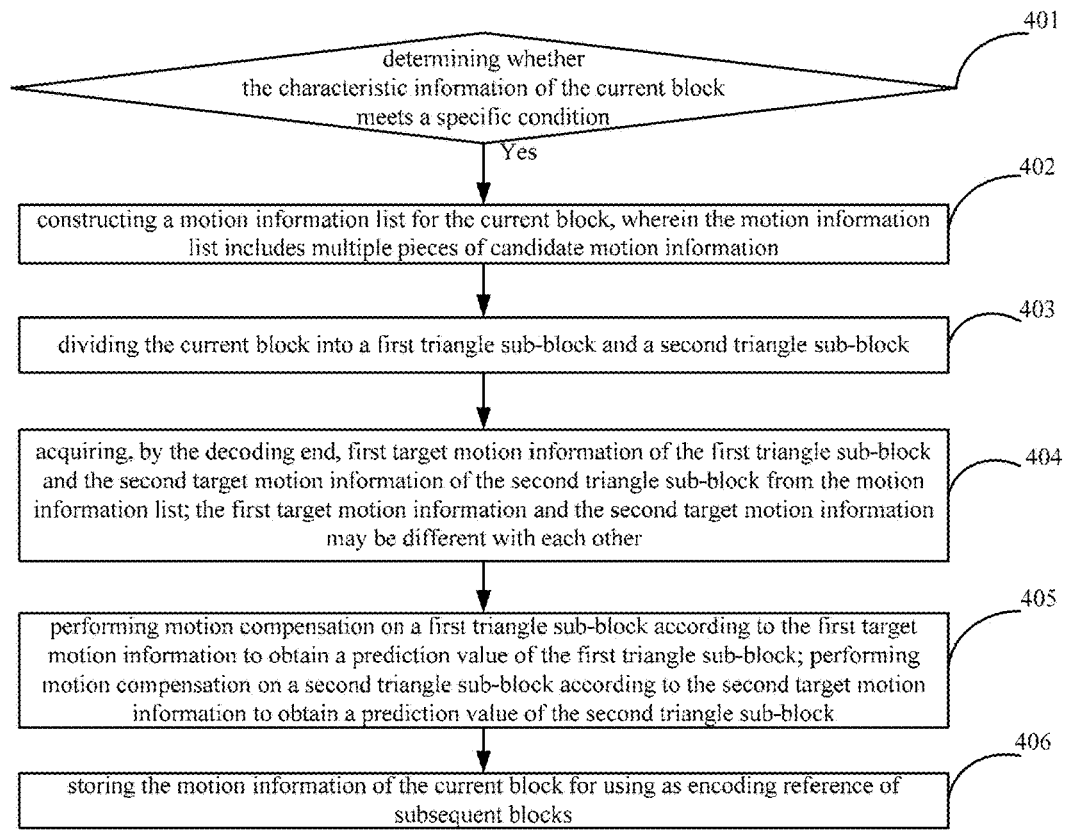
FIG. 4 is a flow diagram of a decoding method according to an embodiment of the present application.

Embodiment 3: similar with the invention conception as described above, an embodiment of the present application provides a decoding method, which may be applied to a decoding end. FIG. 4 is a schematic flow diagram of the method. The method may include:

At step 401, determining, by the decoding end, whether the characteristic information of the current block meets specific conditions; if yes, enabling the geometric partitioning mode with triangular partition and executing step 402; if not, not enabling the geometric partitioning mode with triangular partition, and no longer implementing the technical solution of this embodiment.

At step 402, constructing, by the decoding end, a motion information list for the current block, wherein the motion information list includes multiple pieces of candidate motion information.

At step 403, dividing, by the decoding end, the current block into a first triangle sub-block and a second triangle sub-block. For example, the current block is divided into a first triangle sub-block and a second triangle sub-block according to the leading diagonal (included angle of 45 degrees from the horizontal right direction); or, the current block is divided into a first triangle sub-block and a second triangle sub-block according to the sub-diagonal (included angle of 135 degrees from the horizontal right direction).

At step 404, acquiring, by the decoding end, first target motion information of the first triangle sub-block and the second target motion information of the second triangle sub-block from the motion information list; the first target motion information and the second target motion information may be different with each other.

At step 405, performing, by the decoding end, motion compensation on a first triangle sub-block based on the first target motion information to obtain a prediction value of the first triangle sub-block; performing motion compensation on a second triangle sub-block based on the second target motion information to obtain a prediction value of the second triangle sub-block. The prediction value of the first triangle sub-block and the prediction value of the second triangle sub-block are the prediction value of the current block.

At step 406, storing, by the decoding end, the motion information of the current block for using as encoding reference of subsequent blocks.

Embodiment 4: at step 301 and step 401, the encoding end/decoding end determines whether the characteristic information of the current block meets specific conditions, if yes, the geometric partitioning mode with triangular partition may be enabled, that is, the current block is divided into the first triangle sub-block and the second triangle sub-block; if not, the geometric partitioning mode with triangular partition will not be enabled. In an example, the characteristic information may include, but is not limited to, one or more of the followings: motion information mode, size information, slice type, sequence-level switch control information.

The following describes that the characteristic information of the current block meets specific conditions in combination with several specific application scenes.

Application scene 1: when the characteristic information meets the following condition, it is determined that the characteristic information of the current block meets specific conditions:
  the motion information mode of the current block is a merge mode or a skip mode, and the motion information mode of the current block is not any of other types of merge sub-modes or skip sub-modes except for the triangle prediction sub-mode.

Application scene 2: when the characteristic information at least meets the following conditions at the same time, it is determined that the characteristic information of the current block meets specific conditions:
  the sequence-level switch control information allows the current block to use the geometric partitioning mode with triangular partition, that is, the sequence-level control allows the geometric partitioning mode with triangular partition to be enabled; that is, the sequence-level control switch is on, which indicates that the current block is allowed to use the geometric partitioning mode with triangular partition;
  the current slice where the current block is located is a B slice, that is, the current slice allows the existence of two reference frame lists;
  the area (width*height) of the current block is greater than or equal to N*N, and N may be 8;
  the motion information mode of the current block is a merge mode or a skip mode.

Application scene 3: when the characteristic information at least meets the following conditions at the same time, it is determined that the characteristic information of the current block meets specific conditions:
  the sequence-level switch control information allows the current block to use the geometric partitioning mode with triangular partition, that is, the sequence-level control allows the geometric partitioning mode with triangular partition to be enabled; that is, the sequence-level control switch is on, which indicates that the current block is allowed to use the geometric partitioning mode with triangular partition;
  the current slice where the current block is located is a B slice, that is, the current slice allows the existence of two reference frame lists;
  the area (width*height) of the current block is greater than or equal to N*N, and N may be 8;
  the motion information mode of the current block is a merge mode, and the motion information mode of the current block is not any one of the regular merge sub-mode, MMVD sub-mode, SB merge sub-mode, CIIP sub-mode;
  the motion information mode of the current block is a skip mode, and the motion information mode of the current block is not any one of the regular merge sub-mode, MMVD sub-mode, SB merge sub-mode.

Application scene 4: when the characteristic information at least meets the following conditions at the same time, it is determined that the characteristic information of the current block meets specific conditions:
  the sequence-level switch control information allows the current block to use the geometric partitioning mode with triangular partition, that is, the sequence-level control allows the geometric partitioning mode with triangular partition to be enabled; that is, the sequence-level control switch is on, which indicates that the current block is allowed to use the geometric partitioning mode with triangular partition;
the current slice where the current block is located is a B slice, that is, the current slice allows the existence of two reference frame lists;
the motion information mode of the current block is a merge mode or a skip mode;
the area (width*height) of the current block is greater than or equal to N*N, and N may be 8;
the width of the current block is less than or equal to M, the height of the current block is less than or equal to M, and M may be 128.

Application scene 5: when the characteristic information at least meets the following conditions at the same time, it is determined that the characteristic information of the current block meets specific conditions:
the sequence-level switch control information allows the current block to use the geometric partitioning mode with triangular partition, that is, the sequence-level control allows the geometric partitioning mode with triangular partition to be enabled; that is, the sequence-level control switch is on, which indicates that the current block is allowed to use the geometric partitioning mode with triangular partition;
the current slice where the current block is located is a B slice, that is, the current slice allows the existence of two reference frame lists;
the motion information mode of the current block is a merge mode or a skip mode;
the area (width*height) of the current block is greater than or equal to N*N, and N may be 8;
the area (width*height) of the current block is greater than or equal to M*M, and M may be 128.

Application scene 6: when the characteristic information at least meets the following conditions at the same time, it is determined that the characteristic information of the current block meets specific conditions:
the sequence-level switch control information allows the current block to use the geometric partitioning mode with triangular partition, that is, the sequence-level control allows the geometric partitioning mode with triangular partition to be enabled; that is, the sequence-level control switch is on, which indicates that the current block is allowed to use the geometric partitioning mode with triangular partition;
the current slice where the current block is located is a B slice, that is, the current slice allows the existence of two reference frame lists;
the motion information mode of the current block is a merge mode or a skip mode;
the width value of the current block is within a range of [Wmin, Wmax]; in an example, both Wmin and Wmax may be a positive integer power of 2, for example, Wmin is 4 and Wmax is 128;
the height value of the current block is within a range of [Hmin, Hmax]; in an example, both Hmin and Hmax may be a positive integer power of 2, for example, Hmin is 4 and Hmax is 128;
the area value of the current block is within the range of [Smin, Smax]; in an example, both Smin and Smax may be a positive integer power of 2, for example, Smin is 64 and Smax is 128*128=16384.

In the above examples, [a, b] means greater than or equal to a, and less than or equal to b.

Application Scene 7: for any one of application scene 2-application scene 6, "the current slice where the current block is located is a B slice" can be modified to "the current slice where the current block is located allows intra block copying, and other limitations remain unchanged". The current slice where the current block is located allowing intra block copying means that the current block can searched for similar blocks in the decoded reconstructed block of the current slice (rather than decoded reconstructed blocks of other frames). Under this condition, the current slice where the current block is located does not need to be a B slice.

Application scene 8: if both of the height value and width value of the current block are CTU Size, the geometric partitioning mode with triangular partition is not enabled; that is, the characteristic information does not meet specific conditions. If the height value of the current block is less than CTU Size, or the width value of the current block is less than CTU Size, any one of application scene 1 to application scene 7 may be adopted to determine whether to enable the geometric partitioning mode with triangular partition.

In an example, CTU Size refers to the maximum size allowed by the current block, which may be 128 or other values.

Application scene 9: if both of the height value and width value of the current block are CTU Size, the geometric partitioning mode with triangular partition is not enabled; that is, the characteristic information does not meet specific conditions. If the height value of the current block is less than CTU Size, and the width value of the current block is less than CTU Size, any one of application scene 1 to application scene 7 may be adopted to determine whether to enable the geometric partitioning mode with triangular partition.

In an example, CTU Size refers to the maximum size allowed by the current block, which may be 128 or other values.

Embodiment 5: at step 302 and step 402, the encoding end/decoding endconstructs a motion information list for the current block, the motion information list may include multiple pieces of candidate motion information. The construction process of the motion information list is described as below.

Manner 1: the encoding/decoding may construct a motion information list, and the motion information list may include multiple pieces of candidate motion information, such as 5 pieces of candidate motion information, and the number is not limited. For example, the candidate block corresponding to the current block is acquired, the motion information of the candidate block is added to the motion information list, and each motion information in the motion information list may be referred to as candidate motion information.

Figure 5A:
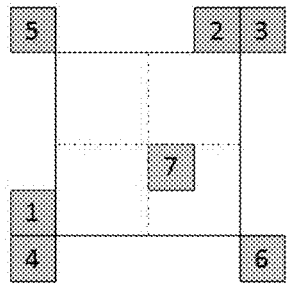
FIGS. 5A-5B are schematic diagrams of candidate blocks according to an embodiment of the present application.

The candidate block corresponding to the current block is shown in FIG. 5A. The blocks at these 7 positions can be regarded as candidate blocks corresponding to the current block. In FIG. 5A, block 1, block 2, block 3, block 4, and block 5 are candidate blocks in the current slice, and block 6 and block 7 are candidate blocks in other frames (that is, time domain corresponding blocks). First, the available motion information of these 7 positions is collected, and are sorted in an order of the unidirectional motion information, the bidirectional predicted L0 motion information, the bidirectional predicted L1 motion information, the mean value of the bidirectional predicted L0 motion information and the L1 motion information. Then, the top 5 motion information is filled into the motion information list. When the number of motion information added into the motion information list is less than 5, a zero motion vector may be used for filling. In the above filling process, duplicate checking processing may also be performed to avoid repeated motion information in the motion information list.

Manner 2: the encoding end/decoding end may use a motion information list building method of the regular merge mode to construct the motion information list for the current block. For example, the motion information list building method of the regular merge mode is determined, and then a motion information list is constructed for the current block based on the motion information list building method of the regular merge mode, and the motion information list includes multiple pieces of candidate motion information. That is, the method for constructing a motion information list in the geometric partitioning mode with triangular partition is the same as the method for constructing a motion information list in the regular merge mode.

Figure 5B:
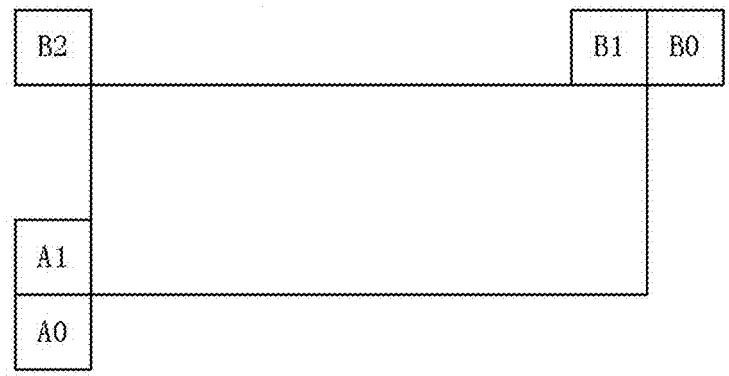

For example, the method for constructing a motion information list in the regular merge mode is shown in FIG. 5B. The candidate blocks corresponding to the current block include block A1, block A0, block B0, block B1, block B2, the available motion information of these 5 positions is collected, the collected available motion information is sorted in the order of block A1, block A0, block B0, block B1, block B2, and the motion information list is filled with multiple pieces of motion information (such as 5 motion information) placed in high ranks. The method for constructing a motion information list in the geometric partitioning mode with triangular partition is: the available motion information of these 5 positions is collected, the collected available motion information are sorted in an order of block A1, block A0, block B0, block B1, block B2, and the motion information list is filled with multiple pieces of motion information (such as 5 pieces of motion information) placed in high ranks. Of course, the above method is only an example of the construction of the motion information list of the regular merge mode, and there is no limitation on this.

Figure 6A:
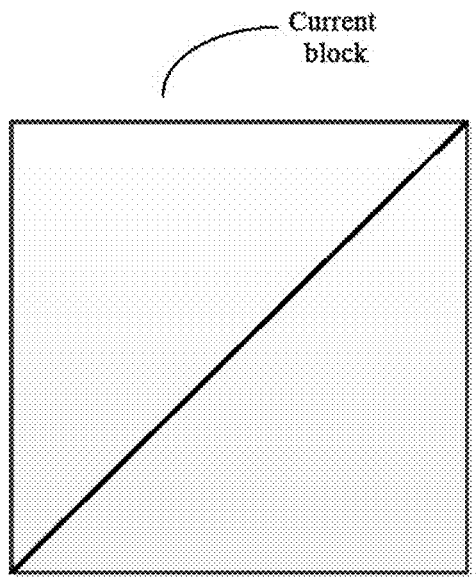
FIGS. 6A-6B schematically illustrate dividing of a current block according to an embodiment of the present application.
Figure 6B:
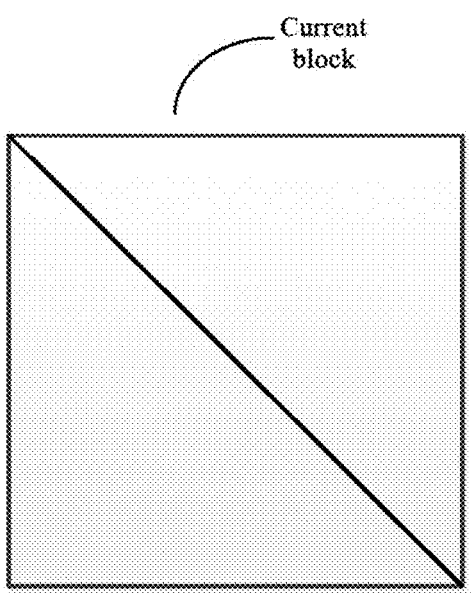

Embodiment 6: at step 303 and step 403, the encoding end/decoding end divides the current block into a first triangle sub-block and a second triangle sub-block. For example, as shown in FIG. 6A, the current block may be divided into a first triangle sub-block and a second triangle sub-block according to the leading diagonal (included angle of 45 degrees from the horizontal right direction); or, as shown in FIG. 6B, the current block may be divided into a first triangle sub-block and a second triangle sub-block according to the sub-diagonal (included angle of 135 degrees from the horizontal right direction).

In order to divide the current block into the first triangle sub-block and the second triangle sub-block, the following manners may be used:

Manner 1: the encoding end uses the leading diagonal method to divide the current block by default through the agreement, and the decoding end uses the leading diagonal method to divide the current block by default through the agreement. On this basis, as shown in FIG. 6A, the encoding end may divide the current block into a first triangle sub-block and a second triangle sub-block according to the leading diagonal (included angle of 45 degrees from the horizontal right direction) method, the decoding end may divide the current block into a first triangle sub-block and a second triangle sub-block according to the leading diagonal method.

Manner 2: by default through the agreement, the encoding end uses the sub-diagonal method to divide the current block and the decoding end uses the sub-diagonal method to divide the current block. On this basis, as shown in FIG. 6B, the encoding end may divide the current block into a first triangle sub-block and a second triangle sub-block according to the sub-diagonal method (included angle of 135 degrees from the horizontal right direction), the decoding end may divide the current block into a first triangle sub-block and a second triangle sub-block according to the sub-diagonal method.

Manner 3: the encoding end determines a rate distortion cost 1 corresponding to the leading diagonal division method and a rate distortion cost 2 corresponding to the sub-diagonal division method. The method for determining the rate distortion cost 1 and the rate distortion cost 2 is not limited herein. If the rate distortion cost 1 is less than the rate distortion cost 2, as shown in FIG. 6A, the encoding end may divide the current block into the first triangle sub-block and the second triangle sub-block according to the leading diagonal method. Alternatively, if the rate distortion cost 1 is greater than the rate distortion cost 2, as shown in FIG. 6B, the encoding end may divide the current block into the first triangle sub-block and the second triangle sub-block according to the sub-diagonal method. Of course, the encoding end may also adopt other strategies or decisions to divide the triangle sub-blocks according to the leading diagonal method or the sub-diagonal method, and there is no limitation on this.

When the encoding end sends the encoded bit stream to the decoding end, the encoded bit stream may include first indication information that is used to indicate division information of the triangle sub-blocks, such as the leading diagonal division method or the sub-diagonal division method.

For example, if the encoding end divides the current block into the first triangle sub-block and the second triangle sub-block according to the leading diagonal method, the division information of the triangle sub-block may be the leading diagonal division method. If the encoding end divides the current block into the first triangle sub-block and the second triangle sub-block according to the sub-diagonal method, the division information of the triangle sub-block may be the sub-diagonal division method.

After receiving the encoded bit stream, the decoding end may acquire the first indication information from the encoded bit stream, which is used to indicate division information of the triangle sub-blocks, such as the leading diagonal division method or the sub-diagonal division method. If the division information of the triangle sub-block is the leading diagonal division method, as shown in FIG. 6A, the decoding end divides the current block into the first triangle sub-block and the second triangle sub-block according to the leading diagonal of the current block; if the division information of the sub-blocks is the sub-diagonal division method, as shown in FIG. 6B, the decoding end divides the current block into the first triangle sub-block and the second triangle sub-block according to the sub-diagonal of the current block.

Of course, the above three implementation manners are only examples, and there is no limitation on the division manner of the triangle sub-blocks.

Embodiment 7: in the above embodiment 6, when the encoding end sends an encoded bit stream to the decoding end, the encoded bit stream may include first indication information, which is used to indicate division information of the triangle sub-block. For example, one flag bit indicates the division information of the triangle sub-block. For example, when the flag bit is a first identifier 0, it indicates that the division information of the triangle sub-block is the leading diagonal division method. When the flag bit is a second identifier 1, it indicated that the division information of the triangle sub-block is the sub-diagonal division method.

In an example, for the division information of the triangle sub-block, the encoding end may use the CABAC mode for encoding the first indication information. Of course, CABAC is only an example, and there is no limitation on this encoding method. The CABAC includes two modes: a CABAC mode that stores and updates at least one context model (that is, the adaptive binary arithmetic encoding of the context), and a bypass CABAC mode that does not need to store and update the context model (that is, the bypass mode binary arithmetic encoding). On this basis, the first indication information (such as the flag bits of the division information of the triangle sub-block) may be encoded in a bypass-based binary arithmetic coding method, or the first indication information may be encoded in a context-based adaptive binary arithmetic coding method, that is, the first indication information is encoded in a context-based adaptive binary arithmetic coding method according to the context model.

When the encoding end uses the CABAC mode to encode the first indication information, the decoding end may use the CABAC mode to decode the first indication information. For example, when the encoding end encodes the first indication information in the bypass-based binary arithmetic coding method, the decoding end decodes the first indication information in the bypass-based binary arithmetic decoding method to obtain the division information of the triangle sub-block. Alternatively, when the encoding end encodes the first indication information in a context-based adaptive binary arithmetic coding method, the decoding end decodes the first indication information in the context-based adaptive binary arithmetic coding method to obtain the division information of the triangle sub-block. That is, according to the context model, the first indication information is decoded in the context-based adaptive binary arithmetic coding method to obtain the division information of the triangle sub-block.

In summary, after the first indication information is decoded, the division information of the triangle sub-block may be obtained, such as a flag bit indicating the division information of the triangle sub-block. When the flag bit is a first identifier 0, it indicated that the division information of the triangle sub-block is the leading diagonal division method. When the flag bit is a second identifier 1, it indicated that the division information of the triangle sub-block is the sub-diagonal division method.

In summary, the decoding end may decode the flag bits of the division information of the triangle sub-block. For example, the CABAC mode is adopted for entropy decoding, and the CABAC adopts a bypass mode without storing and updating of the context model. Alternatively, the decoding end may decode the flag bits of the division information of the triangle sub-block. For example, the CABAC mode is adopted for entropy decoding, and the CABAC adopts a mode containing the context model.

Embodiment 8: at step 304 and step 404, the encoding end/decoding end acquires the first target motion information of the first triangle sub-block and the second target motion information of the second triangle sub-block from the motion information list. The first target motion information and the second target motion information may be different with each other. The process of acquiring the first target motion information and the second target motion information is described as follows:

Manner 1: the encoding end may determine the first target motion information through an agreement by default. For example, the encoding end may determine by default that the first candidate motion information in the motion information list is the first target motion information of the first triangle sub-block. The decoding end may determine the first target motion information through an agreement by default. For example, the decoding end may determine by default that the first candidate motion information in the motion information list is the first target motion information of the first triangle sub-block. The encoding end may determine the second target motion information through an agreement by default. For example, the encoding end may determine by default that the second candidate motion information in the motion information list is the second target motion information of the second triangle sub-block. The decoding end may determine the second target motion information through an agreement by default. For example, the decoding end may determine by default that the second candidate motion information in the motion information list is the second target motion information of the second triangle sub-block.

Manner 2: the encoding end determines the rate distortion cost corresponding to each candidate motion information in the motion information list, and there is no limitation on the determination method, and the candidate motion information corresponding to the minimum rate distortion cost is regarded as the first target motion information of the first triangle sub-block. The encoding end excludes the first target motion information from the motion information list (that is, does not select the first target motion information in the motion information list). On this basis, the encoding end determines the rate distortion cost corresponding to each remaining candidate motion information in the motion information list (that is, each remaining candidate motion information excluding the first target motion information), and determines the candidate motion information corresponding to the minimum rate distortion cost as the second target motion information of the second triangle sub-block. Of course, the encoding end may also adopt other strategies to determine the first target motion information of the first triangle sub-block and the second target motion information of the second triangle sub-block, which is not limited herein.

When the encoding end sends an encoded bit stream to the decoding end, the encoded bit stream may include second indication information, which is used to indicate a first index value of the first target motion information in the motion information list (which is used to indicate which one candidate motion information the first target motion information is in the motion information list), a second index value of the second target motion information in the motion information list (which is used to indicate which one candidate motion information the second target motion information is in the motion information list).

After receiving the encoded bit stream, the decoding end may acquire second indication information from the encoded bit stream, which is used to indicate a first index value of the first target motion information in the motion information list (used to indicate which one candidate motion information the first target motion information is in the motion information list), a second index value of the second target motion information in the motion information list (used to indicate which one candidate motion information the second target motion information is in the motion information list). Based on the first index value indicated by the second indication information, the decoding end acquires candidate information corresponding to the first index value from the motion information list, and determines the acquired candidate information corresponding to the first index value as first target motion information of the first triangle sub-block; based on the second index value indicated by the second indication information, the decoding end acquires candidate information corresponding to the second index value from the motion information list, and determines the candidate information corresponding to the second index value as second target motion information of the second triangle sub-block.

Embodiment 9: in the above embodiment 8, the encoding end/decoding end may also determine which unidirectional motion information is used for the first target motion information of the first triangle sub-block based on the parity of the first index value, and the encoding end/decoding end may also determine which unidirectional motion information is used for the second target motion information of the second triangle sub-block based on the parity of the second index value.

After the decoding end acquires the first index value (used to indicate the index value of the first target motion information in the motion information list) from the encoded bit stream, if the first index value is an even number, it is determined whether the candidate motion information corresponding to the first index value includes the unidirectional motion information corresponding to list0. If yes, determining the unidirectional motion information corresponding to list0 as the first target motion information of the first triangle sub-block. If not, determining the unidirectional motion information corresponding to list1 as the first target motion information of the first triangle sub-block.

In an example, the decoding end may acquire candidate motion information corresponding to the first index value from the motion information list. If the first index value is an even number, and the candidate motion information corresponding to the first index value is bidirectional motion information, the bidirectional motion information includes unidirectional motion information corresponding to list0 and unidirectional motion information corresponding to list1, then the unidirectional motion information corresponding to list0 may be determined as the first target motion information of the first triangle sub-block. If the first index value is an even number, and the candidate motion information corresponding to the first index value is bidirectional motion information, the bidirectional motion information is unidirectional motion information corresponding to list0, then the unidirectional motion information corresponding to list0 may be determined as the first target motion information of the first triangle sub-block. If the first index value is an even number, and the candidate motion information corresponding to the first index value is bidirectional motion information, the bidirectional motion information is unidirectional motion information corresponding to list1, then the unidirectional motion information corresponding to list1 may be determined as the first target motion information of the first triangle sub-block.

After the decoding end acquires the first index value (used to indicate the index value of the first target motion information in the motion information list) from the encoded bit stream, if the first index value is an odd number, it is determined whether the candidate motion information corresponding to the first index value includes the unidirectional motion information corresponding to list1; if yes, the unidirectional motion information corresponding to list1 is determined as the first target motion information of the first triangle sub-block; if not, the unidirectional motion information corresponding to list0 is determined as the first target motion information of the first triangle sub-block.

In an example, the decoding end may acquire candidate motion information corresponding to the first index value from the motion information list. If the first index value is an odd number, and the candidate motion information corresponding to the first index value is bidirectional motion information, the bidirectional motion information includes unidirectional motion information corresponding to list0 and unidirectional motion information corresponding to list1, then the unidirectional motion information corresponding to list1 may be determined as the first target motion information of the first triangle sub-block. If the first index value is an odd number, and the candidate motion information corresponding to the first index value is bidirectional motion information, the bidirectional motion information is unidirectional motion information corresponding to list1, then the unidirectional motion information corresponding to list1 may be determined as the first target motion information of the first triangle sub-block. If the first index value is an odd number, and the candidate motion information corresponding to the first index value is bidirectional motion information, the bidirectional motion information is unidirectional motion information corresponding to list0, then the unidirectional motion information corresponding to list0 may be determined as the first target motion information of the first triangle sub-block.

After the decoding end acquires the second index value (used to indicate the index value of the second target motion information in the motion information list) from the encoded bit stream, if the second index value is an even number, it is determined whether the candidate motion information corresponding to the second index value includes the unidirectional motion information corresponding to list0: if yes, the unidirectional motion information corresponding to list0 is determined as the second target motion information of the second triangle sub-block; and if not, determining the unidirectional motion information corresponding to list1 is determined as the second target motion information of the second triangle sub-block.

In an example, the decoding end may acquire candidate motion information corresponding to the second index value from the motion information list. If the second index value is an even number, and the candidate motion information corresponding to the second index value is bidirectional motion information, the bidirectional motion information includes unidirectional motion information corresponding to list0 and unidirectional motion information corresponding to list1, then the unidirectional motion information corresponding to list0 may be determined as the second target motion information of the second triangle sub-block. If the second index value is an even number, and the candidate motion information corresponding to the second index value is bidirectional motion information, the bidirectional motion information is unidirectional motion information corresponding to list0, then the unidirectional motion information corresponding to list0 may be determined as the second target motion information of the second triangle sub-block. If the second index value is an even number, and the candidate motion information corresponding to the second index value is bidirectional motion information, the bidirectional motion information is unidirectional motion information corresponding to list1, then the unidirectional motion information corresponding to list1 may be determined as the second target motion information of the second triangle sub-block.

After the decoding end acquires the second index value (used to indicate the index value of the second target motion information in the motion information list) from the encoded bit stream, if the second index value is an odd number, it is determined whether the candidate motion information corresponding to the second index value includes the unidirectional motion information corresponding to list1; if yes, the unidirectional motion information corresponding to list1 is determined as the second target motion information of the second triangle sub-block; if not, the unidirectional motion information corresponding to list0 is determined as the second target motion information of the second triangle sub-block.

In an example, the decoding end may acquire candidate motion information corresponding to the second index value from the motion information list. If the second index value is an odd number, and the candidate motion information corresponding to the second index value is bidirectional motion information, the bidirectional motion information includes unidirectional motion information corresponding to list0 and unidirectional motion information corresponding to list1, then the unidirectional motion information corresponding to list1 may be determined as the second target motion information of the second triangle sub-block. If the second index value is an odd number, and the candidate motion information corresponding to the second index value is bidirectional motion information, the bidirectional motion information is unidirectional motion information corresponding to list1, then the unidirectional motion information corresponding to list1 may be determined as the second target motion information of the second triangle sub-block. If the second index value is an odd number, and the candidate motion information corresponding to the second index value is bidirectional motion information, the bidirectional motion information is unidirectional motion information corresponding to list0, then the unidirectional motion information corresponding to list0 may be determined as the second target motion information of the second triangle sub-block.

When determining the first target motion information of the first triangle sub-block, the encoding end selects the candidate motion information corresponding to the minimum rate distortion cost from the motion information list (subsequently referred to as A1), and determines the index value (that is, the first index value) of the candidate motion information A1 in the motion information list, and the first index value indicates the position of the candidate motion information A1 in the motion information list.

If the first index value is an even number, the encoding end determines whether the candidate motion information A1 includes unidirectional motion information corresponding to list0; if yes, the encoding end determines the unidirectional motion information corresponding to list0 as the first target motion information of the first triangle sub-block; if not, the encoding end determines the unidirectional motion information corresponding to list1 as the first target motion information of the first triangle sub-block.

If the first index value is an odd number, the encoding end determines whether the candidate motion information A1 includes unidirectional motion information corresponding to list1; if yes, the encoding end determines the unidirectional motion information corresponding to list1 as the first target motion information of the first triangle sub-block; and if not, the encoding end determines the unidirectional motion information corresponding to list0 as the first target motion information of the first triangle sub-block.

When determining the second target motion information of the second triangle sub-block, the encoding end selects the candidate motion information corresponding to the minimum rate distortion cost from the motion information list (subsequently referred to as A2), and determines the index value (that is, the second index value) of the candidate motion information A2 in the motion information list, and the second index value indicates the position of the candidate motion information A2 in the motion information list.

If the second index value is an even number, the encoding end determines whether the candidate motion information A2 includes unidirectional motion information corresponding to list0; if yes, the encoding end determines the unidirectional motion information corresponding to list0 as the second target motion information of the second triangle sub-block; if not, the encoding end determines the unidirectional motion information corresponding to list1 as the second target motion information of the second triangle sub-block.

If the second index value is an odd number, the encoding end determines whether the candidate motion information A2 includes unidirectional motion information corresponding to list1; if yes, the encoding end determines the unidirectional motion information corresponding to list1 as the second target motion information of the second triangle sub-block; if not, the encoding end determines the unidirectional motion information corresponding to list0 as the second target motion information of the second triangle sub-block.

In summary, as shown in FIG. 7A, when the first index value/second index value is an even number, if there is unidirectional motion information corresponding to list0 in the candidate motion information corresponding to the first index value/second index value, the unidirectional motion information corresponding to list0 is regarded as the target motion information; if there is no unidirectional motion information corresponding to list0 in the candidate motion information corresponding to the first index value/second index value, the unidirectional motion information corresponding to list1 is regarded as the target motion information. When the first index value/second index value is an odd number, if there is unidirectional motion information corresponding to list1 in the candidate motion information corresponding to the first index value/second index value, the unidirectional motion information corresponding to list1 is regarded as the target motion information; if there is no unidirectional motion information corresponding to list1 in the candidate motion information corresponding to the first index value/second index value, the unidirectional motion information corresponding to list0 is regarded as the target motion information.

In the foregoing embodiment, the first index value may be recorded as candIdx1, and the second index value may be recorded as candIdx2.

In an example, when the slice type of the current slice where the current block is located is a B slice, the B slice allows the existence of inter-blocks pointing to multiple lists (reference frame lists) at the same time, such as an inter prediction block pointing to list0 and an inter prediction block pointing to list1. Therefore, when the current slice where the current slice is located is a B slice, the reference frame configuration of the current slice where the current block is located may include two reference frame lists, i.e., list0 and list1. In summary, the candidate motion information may be unidirectional motion information, and the unidirectional motion information is unidirectional motion information corresponding to list0 or unidirectional motion information corresponding to list1; or, the candidate motion information may be bidirectional motion information, and the bidirectional motion information includes unidirectional motion information corresponding to list0 and unidirectional motion information corresponding to list1.

Embodiment 10: in the above embodiment 8, the encoding end/decoding end may also determine which unidirectional motion information is used for the first target motion information of the first triangle sub-block based on the parity of the first index value, and the encoding end/decoding end may also determine which unidirectional motion information is used for the second target motion information of the second triangle sub-block based on the parity of the second index value.

After the decoding end acquires the first index value (used to indicate the index value of the first target motion information in the motion information list) from the encoded bit stream, if the first index value is an odd number, it is determined whether the candidate motion information corresponding to the first index value includes the unidirectional motion information corresponding to list1; if yes, determining the unidirectional motion information corresponding to list0 as the first target motion information of the first triangle sub-block; and if not, determining the unidirectional motion information corresponding to list1 as the first target motion information of the first triangle sub-block.

In an example, the decoding end may acquire candidate motion information corresponding to the first index value from the motion information list. If the first index value is an odd number, and the candidate motion information corresponding to the first index value is bidirectional motion information, the bidirectional motion information includes unidirectional motion information corresponding to list0 and unidirectional motion information corresponding to list1, the unidirectional motion information corresponding to list0 may be determined as the first target motion information of the first triangle sub-block. If the first index value is an odd number and the candidate motion information corresponding to the first index value is bidirectional motion information, the bidirectional motion information is unidirectional motion information corresponding to list0, the unidirectional motion information corresponding to list0 may be determined as the first target motion information of the first triangle sub-block. If the first index value is an odd number and the candidate motion information corresponding to the first index value is bidirectional motion information, the bidirectional motion information is unidirectional motion information corresponding to list1, the unidirectional motion information corresponding to list1 may be determined as the first target motion information of the first triangle sub-block.

After the decoding end acquires the first index value (used to indicate the index value of the first target motion information in the motion information list) from the encoded bit stream, if the first index value is an even number, it is determined whether the candidate motion information corresponding to the first index value includes the unidirectional motion information corresponding to list1; if yes, determining the unidirectional motion information corresponding to list1 as the first target motion information of the first triangle sub-block; and if not, determining the unidirectional motion information corresponding to list0 as the first target motion information of the first triangle sub-block.

In an example, the decoding end may acquire candidate motion information corresponding to the first index value from the motion information list. If the first index value is an even number, and the candidate motion information corresponding to the first index value is bidirectional motion information, the bidirectional motion information includes unidirectional motion information corresponding to list0 and unidirectional motion information corresponding to list1, the unidirectional motion information corresponding to list1 may be determined as the first target motion information of the first triangle sub-block. If the first index value is an even number, and the candidate motion information corresponding to the first index value is bidirectional motion information, the bidirectional motion information is unidirectional motion information corresponding to list1, the unidirectional motion information corresponding to list1 may be determined as the first target motion information of the first triangle sub-block. If the first index value is an even number, and the candidate motion information corresponding to the first index value is bidirectional motion information, the bidirectional motion information is unidirectional motion information corresponding to list0, the unidirectional motion information corresponding to list0 may be determined as the first target motion information of the first triangle sub-block.

After the decoding end acquires the second index value (used to indicate the index value of the second target motion information in the motion information list) from the encoded bit stream, if the second index value is an odd number, it is determined whether the candidate motion information corresponding to the second index value includes the unidirectional motion information corresponding to list0; if yes, determining the unidirectional motion information corresponding to list0 as the second target motion information of the second triangle sub-block; and if not, determining the unidirectional motion information corresponding to list1 as the second target motion information of the second triangle sub-block.

In an example, the decoding end may acquire candidate motion information corresponding to the second index value from the motion information list. If the second index value is an odd number, and the candidate motion information corresponding to the second index value is bidirectional motion information, the bidirectional motion information includes unidirectional motion information corresponding to list0 and unidirectional motion information corresponding to list1, and thus the unidirectional motion information corresponding to list0 may be determined as the second target motion information of the second triangle sub-block. If the second index value is an odd number, and the candidate motion information corresponding to the second index value is bidirectional motion information, the bidirectional motion information is unidirectional motion information corresponding to list0, then the unidirectional motion information corresponding to list0 may be determined as the second target motion information of the second triangle sub-block. If the second index value is an odd number, and the candidate motion information corresponding to the second index value is bidirectional motion information, the bidirectional motion information is unidirectional motion information corresponding to list1, then the unidirectional motion information corresponding to list1 may be determined as the second target motion information of the second triangle sub-block.

After the decoding end acquires the second index value (used to indicate the index value of the second target motion information in the motion information list) from the encoded bit stream, if the second index value is an even number, it is determined whether the candidate motion information corresponding to the second index value includes the unidirectional motion information corresponding to list1; if yes, determining the unidirectional motion information corresponding to list1 as the second target motion information of the second triangle sub-block; if not, determining the unidirectional motion information corresponding to list0 as the second target motion information of the second triangle sub-block.

In an example, the decoding end may acquire candidate motion information corresponding to the second index value from the motion information list. If the second index value is an even number, and the candidate motion information corresponding to the second index value is bidirectional motion information, the bidirectional motion information includes unidirectional motion information corresponding to list0 and unidirectional motion information corresponding to list1, then the unidirectional motion information corresponding to list1 may be determined as the second target motion information of the second triangle sub-block. If the second index value is an even number, and the candidate motion information corresponding to the second index value is bidirectional motion information, the bidirectional motion information is unidirectional motion information corresponding to list1, then the unidirectional motion information corresponding to list1 may be determined as the second target motion information of the second triangle sub-block. If the second index value is an even number, and the candidate motion information corresponding to the second index value is bidirectional motion information, the bidirectional motion information is unidirectional motion information corresponding to list0, then the unidirectional motion information corresponding to list0 may be determined as the second target motion information of the second triangle sub-block.

When determining the first target motion information of the first triangle sub-block, the encoding end selects the candidate motion information corresponding to the minimum rate distortion cost from the motion information list (subsequently referred to as A1), and determines the index value (that is, the first index value) of the candidate motion information A1 in the motion information list, and the first index value indicates the position of the candidate motion information A1 in the motion information list.

If the first index value is an odd number, the encoding end determines whether the candidate motion information A1 includes unidirectional motion information corresponding to list0; if yes, the encoding end determines the unidirectional motion information corresponding to list0 as the first target motion information of the first triangle sub-block; if not, the encoding end determines the unidirectional motion information corresponding to list1 as the first target motion information of the first triangle sub-block.

If the first index value is an even number, the encoding end determines whether the candidate motion information A1 includes unidirectional motion information corresponding to list1; if yes, the encoding end determines the unidirectional motion information corresponding to list1 as the first target motion information of the first triangle sub-block; and if not, the encoding end determines the unidirectional motion information corresponding to list0 as the first target motion information of the first triangle sub-block.

When determining the second target motion information of the second triangle sub-block, the encoding end selects the candidate motion information corresponding to the minimum rate distortion cost from the motion information list (subsequently referred to as A2), and determines the index value (that is, the second index value) of the candidate motion information A2 in the motion information list, and the second index value indicates the position of the candidate motion information A2 in the motion information list.

If the second index value is an odd number, the encoding end determines whether the candidate motion information A2 includes unidirectional motion information corresponding to list0; if yes, the encoding end determines the unidirectional motion information corresponding to list0 as the second target motion information of the second triangle sub-block; if not, the encoding end determines the unidirectional motion information corresponding to list1 as the second target motion information of the second triangle sub-block.

If the second index value is an even number, the encoding end determines whether the candidate motion information A2 includes unidirectional motion information corresponding to list1; if yes, the encoding end determines the unidirectional motion information corresponding to list1 as the second target motion information of the second triangle sub-block; if not, the encoding end determines the unidirectional motion information corresponding to list0 as the second target motion information of the second triangle sub-block.

Embodiment 11: in the above embodiment 8, the encoding end/decoding end may also acquire a first candidate set and a second candidate set based on the motion information list. In an example, the first candidate set may include parts of candidate motion information in the motion information list, the second candidate set may include parts of candidate motion information in the motion information list, and the candidate motion information in the first candidate set is not exactly the same as the candidate motion information in the second candidate set.

The encoding end determines the rate distortion cost corresponding to each candidate motion information in the first candidate set, and the candidate motion information corresponding to the minimum rate distortion cost is determined as the first target motion information of the first triangle sub-block. Then, the encoding end excludes the first target motion information from the second candidate set, and determines the rate distortion cost corresponding to each remaining candidate motion information in the second candidate set (that is, each remaining candidate motion information excluding the first target motion information), and determines the candidate motion information corresponding to the minimum rate distortion cost as the second target motion information of the second triangle sub-block.

When the encoding end sends an encoded bit stream to the decoding end, the encoded bit stream may include second indication information, and the second indication information is used to indicate a first index value of the first target motion information in the first candidate set (used to indicate which one candidate motion information the first target motion information is in the first candidate set), a second index value of the second target motion information in the second candidate set (used to indicate which one candidate motion information the second target motion information is in the second candidate set).

For the decoding end, after the decoding end receives an encoded bit stream, the decoding end may also acquire second indication information from the encoded bit stream. The second indication information may be used to indicate the first index value of the first target motion information in the first candidate set, and the second index value of the second target motion information in the second candidate set. Based on the first index value of the second indication information, the decoding end may acquire candidate motion information corresponding to the first index value from the first candidate set, and determine the acquired candidate motion information corresponding to the first index value as the first target motion information of the first triangle sub-block. Further, based on the second index value of the second indication information, the decoding end may acquire candidate motion information corresponding to the second index value from the second candidate set, and determine the acquired candidate motion information corresponding to the second index value as the second target motion information of the second triangle sub-block.

Embodiment 12: FIG. 7B is a schematic diagram for dividing a triangle sub-block when splitDir=0, splitDir is a flag bit of the division direction, which indicates the division information of the triangle sub-block. SplitDir=0 indicates that the current block is divided into the first triangle sub-block and the second triangle sub-block according to the leading diagonal (included angle of 45 degrees from the horizontal right direction). The motion information list includes motion information of block A1, motion information of block B1, motion information of block B0, motion information of block A0, and motion information of block B2.

In an example, the sort order of the motion information in the motion information list may be: the motion information of block A1, the motion information of block B1, the motion information of block B0, the motion information of block A0, and the motion information of block B2. If the motion information of block A1 is available, the motion information of block A1 is added to the motion information list according to the above sort order; if the motion information of block A1 is not available, the motion information of block A1 is not added to the motion information list; if the motion information of block B1 is available, the motion information of block B1 is added to the motion information list according to the above sort order; if the motion information of block B1 is not available, the motion information of block B1 is not added to the motion information list, and so on. In practical applications, some other types of motion information, such as time domain motion information, may also be inserted between the motion information of block B0 and the motion information of block A0, and there is no limitation on this herein.

For the first triangle sub-block above, there is a high probability that the motion information of block A1 and the motion information of block A0 are not selected. Assuming that, in the motion information list, the index value of the motion information of block A1 is 0, and the index value of the motion information of block B0 is 0, the index value of the motion information of block B1 is 2, the index value of the motion information of block A0 is 3, the index value of the motion information of block B2 is 4, and the first candidate set includes the motion information of block B0, the motion information of block B1, the motion information of block B2.

The encoding end encodes the motion information of the block B0 through the first index value "0", which indicates the first candidate motion information in the first candidate set and also the second candidate motion information in the motion information list. That is, the first index value "0" may correspond to the index value 1 in the motion information list. The encoding end encodes the motion information of the block B1 through the first index value "10", which indicates the second candidate motion information in the first candidate set and also the third candidate motion information in the motion information list. That is, the first index value "10" may correspond to the index value 2 of the motion information list. The encoding end encodes the motion information of the block B2 through the first index value "11", which indicates the third candidate motion information in the first candidate set and also the fifth candidate motion information in the motion information list. That is, the first index value "11" may correspond to the index value 4 of the motion information list.

After the decoding end acquires the first index value from the encoded bit stream, if the first index value is "0", the decoding end may regard the first candidate motion information in the first candidate set (that is, the second candidate motion information in the motion information list) as the first target motion information of the first triangle sub-block. If the first index value is "10", the decoding end may regard the first candidate motion information in the second candidate set (that is, the third candidate motion information in the motion information list) as the first target motion information of the first triangle sub-block. If the first index value is "11", the decoding end may regard the third candidate motion information in the first candidate set (that is, the fifth candidate motion information in the motion information list) as the first target motion information of the first triangle sub-block.

For the second triangle sub-block below, there is a high probability that the motion information of block B1 and the motion information of block B0 are not selected. Assuming that, in the motion information list, the index value of the motion information of block A1 is 0, and the index value of the motion information of block B0 is 0, the index value of the motion information of block B1 is 2, the index value of the motion information of block A0 is 3, the index value of the motion information of block B2 is 4, and the second candidate set may include the motion information of block A0, the motion information of block B1, the motion information of block A1.

The encoding end encodes the motion information of the block A1 through the second index value "0", which indicates the first candidate motion information in the second candidate set and also the first candidate motion information in the motion information list, that is, the second index value "0" may correspond to the index value 0 of the motion information list. The encoding end encodes the motion information of the block A0 through the second index value "10", which indicates the second candidate motion information in the second candidate set and also the fourth candidate motion information in the motion information list. That is, the second index value "10" may correspond to the index value 3 of the motion information list. The encoding end encodes the motion information of the block B2 through the second index value "10", which indicates the third candidate motion information in the second candidate set and also the fifth candidate motion information in the motion information list. That is, the second index value "10" may correspond to the index value 3 of the motion information list.

After the decoding end acquires the second index value from the encoded bit stream, if the second index value is "0", the decoding end may regard the first candidate motion information in the second candidate set (that is, the first candidate motion information in the motion information list) as the second target motion information of the second triangle sub-block. If the second index value is "10", the decoding end may regard the second candidate motion information in the second candidate set (that is, the fourth candidate motion information in the motion information list) as the second target motion information of the second triangle sub-block. If the second index value is "11", the decoding end may regard the second candidate motion information in the third candidate set (that is, the fifth candidate motion information in the motion information list) as the second target motion information of the second triangle sub-block.

In an example, since the second target motion information is different with the first target motion information, that is, the second index value and the first index value do not correspond to the same candidate motion information in the motion information list. Therefore, when the first target motion information is the motion information of block B2, that is, the first index value is "11", and the second candidate set includes the motion information of block A0 and the motion information of block A1.

The encoding end encodes the motion information of the block A1 through the second index value "0", which indicates the first candidate motion information in the second candidate set and also the first candidate motion information in the motion information list. The encoding end encodes the motion information of the block A0 through the second index value "1", which indicates the second candidate motion information in the second candidate set and also the fourth candidate motion information in the motion information list. After the decoding end acquires the second index value from the encoded bit stream, if the second index value is "0", the first candidate motion information in the second candidate set (that is, the first candidate motion information in the motion information list) is regarded as the second target motion information of the second triangle sub-block. If the second index value is "1", the second candidate motion information in the second candidate set (that is, the fourth candidate motion information in the motion information list) is regarded as the second target motion information of the second triangle sub-block.

In an example, if the first target motion information is not the motion information of block B2, the second candidate set includes the motion information of block A0, the motion information of block A1, and the motion information of block B2. For the encoding and decoding method, the above-mentioned embodiment may be referred, and the details will not be repeated herein.

In summary, if the first index value (candIdx1) is 11, that is, the index value of the corresponding motion information list is 4, the second index value (candIdx2) has only two possibilities: index value 0 and index value 3. Therefore, the encoding end encodes the motion information corresponding to the index value 0 (that is, the first candidate motion information in the motion information list) through the second index value "0", and the encoding end encodes the motion information corresponding to the index value 3 (that is, the fourth candidate motion information in the motion information list) through the second index value "1". If the first index value (candIdx1) is not 11, that is, it does not correspond to the index value 4 of the motion information list, then the decoding process of the second index value may be referred to Table 1. In this case, the second index value (candidx2) has three possibilities: index value 0, index value 3 and index value 4. Therefore, the encoding end encodes the motion information corresponding to the index value 0 through the second index value "0", the encoding end encodes the motion information corresponding to the index value 3 through the second index value "10", and the encoding end encodes the motion information corresponding to the index value 4 through the second index value "11".

TABLE 1

| Received codeword | | Second index value |
|---|---|---|
| 0 | | 0 (corresponding to index value 0) |
| 1 | 0 | 10 (corresponding to index value 3) |
| 1 | 1 | 11 (corresponding to index value 4) |

In an example, the first index value (candIdx1) may be limited to corresponding index values 1 and 2, that is, the first index value corresponds to the motion information of block B0 (the index value is 1) or the motion information of block B1 (the index value is 2). That is, the first index value (candIdx1) only needs 1 binary bit to be encoded. For example, the index value 1 is encoded by 0 and the index value 2 is encoded by 1. The second index value (candIdx2) may correspond to index values 0, 3, and 4, that is, the second index value corresponds to the motion information of block A1 (index value is 0), the motion information of block A0 (index value is 3), and the motion information of block B2 (the index value is 4). Obviously, the motion information corresponding to the second index value is different from the motion information corresponding to the first index value. On this basis, the three index values may be encoded by 0, 10, and 11. For example, the index value 0 is encoded by 0, the index value 3 is encoded by 10, and the index value 4 is encoded by 11. The above method does not need to rely on the first index value to perform the decoding process, which reduces the dependence on parsing.

In an example, the first index value (candIdx1) may be limited to correspond to index values 1, 2 and 4, that is, the first index value corresponds to the motion information of block B0 (the index value is 1), the motion information of block B1 (the index value is 2), the motion information of block B2 (the index value if 4). That is, the first index value (candIdx1) may be encoded through 0, 10, 11. For example, the index value 1 is encoded by 0, the index value 2 is encoded by 10, and the index value 4 is encoded by 11. The second index value (candIdx2) may be limited to correspond to index values 0 and 3, that is, the second index value corresponds to the motion information of block A1 (index value is 0), and the motion information of block A0 (index value is 3). Obviously, the motion information corresponding to the second index value is different from the motion information corresponding to the first index value. On this basis, the two index values may be encoded by 0 and 1. For example, the index value 0 is encoded by 0, and the index value 3 is encoded by 1. The above method does not need to rely on the first index value to perform the decoding process, which reduces the dependence on parsing.

Embodiment 13: FIG. 7C is a schematic diagram for dividing a triangle sub-block when splitDir=1, splitDir is a flag bit of the division direction, which indicates the division information of the triangle sub-block. SplitDir=1 indicates that the current block is divided into the first triangle sub-block and the second triangle sub-block according to the sub-diagonal (included angle of 135 degrees from the horizontal right direction). The motion information list includes motion information of block A1, motion information of block B1, motion information of block B0, motion information of block A0, and motion information of block B2.

For the first triangle sub-block above, there is no need to construct a first candidate set for the first triangle sub-block. The encoding end/decoding end may directly select the first target motion information from the motion information list, the selection process will not be repeated here.

For the second triangle sub-block below, there is a high probability that the motion information of block B2 are not selected. Assuming that, in the motion information list, the index value of the motion information of block A1 is 0, and the index value of the motion information of block B0 is 0, the index value of the motion information of block B1 is 2, the index value of the motion information of block A0 is 3, the index value of the motion information of block B2 is 4, and the second candidate set may include the motion information of block A1, the motion information of block A0, the motion information of block B0, and the motion information of block B1.

If the first target motion information is the fifth motion information in the motion information list (the motion information of block B2), the index value corresponding to the first target motion information is 4. In this case, the encoding end may encodes the motion information of block A1 through the second index value "0", which indicates the first candidate motion information in the second candidate set and also the first candidate motion information in the motion information list, that is, the second index value "0" may correspond to the index value 0 of the motion information list. The encoding end may encode the motion information of the block B0 through the second index value "10", which indicates the second candidate motion information in the second candidate set and also the second candidate motion information in the motion information list, that is, the second index value "10" may correspond to the index value 1 of the motion information list. The encoding end may encode the motion information of the block B1 through the second index value "110", which indicates the third candidate motion information in the second candidate set and also the third candidate motion information in the motion information list, that is, the second index value "110" may correspond to the index value 2 of the motion information list. The encoding end may encode the motion information of the block A0 through the second index value "111", which indicates the fourth candidate motion information in the second candidate set and also the fourth candidate motion information in the motion information list, that is, the second index value "111" may correspond to the index value 3 of the motion information list.

After the decoding end acquires the second index value from the encoded bit stream, if the second index value is "0", the decoding end may regard the first candidate motion information in the second candidate set (that is, the first candidate motion information in the motion information list) as the second target motion information of the second triangle sub-block. If the second index value is "10", the decoding end may regard the second candidate motion information in the second candidate set (that is, the second candidate motion information in the motion information list) as the second target motion information of the second triangle sub-block. If the second index value is "110", the decoding end may regard the third candidate motion information in the second candidate set (that is, the third candidate motion information in the motion information list) as the second target motion information of the second triangle sub-block. If the second index value is "111", the decoding end may regard the fourth candidate motion information in the second candidate set (that is, the fourth candidate motion information in the motion information list) as the second target motion information of the second triangle sub-block.

If the first index value does not correspond to the index value 4, the following description takes the first index value corresponding to the index value 3 as an example, which indicates that the first target motion information is the fourth motion information in the motion information list (that is, the motion information of block B2). In this case, the encoding end may encodes the motion information of block A1 through the second index value "0", which indicates the first candidate motion information in the second candidate set and also the first candidate motion information in the motion information list, that is, the second index value "0" may correspond to the index value 0 of the motion information list. The encoding end may encode the motion information of the block B0 through the second index value "10", which indicates the second candidate motion information in the second candidate set and also the second candidate motion information in the motion information list, that is, the second index value "10" may correspond to the index value 1 of the motion information list. The encoding end may encode the motion information of the block B1 through the second index value "11", which indicates the third candidate motion information in the second candidate set and also the third candidate motion information in the motion information list, that is, the second index value "11" may correspond to the index value 2 of the motion information list.

After the decoding end acquires the second index value from the encoded bit stream, if the second index value is "0", the decoding end may regard the first candidate motion information in the second candidate set (that is, the first candidate motion information in the motion information list) as the second target motion information of the second triangle sub-block. If the second index value is "10", the decoding end may regard the second candidate motion information in the second candidate set (that is, the second candidate motion information in the motion information list) as the second target motion information of the second triangle sub-block. If the second index value is "11", the decoding end may regard the third candidate motion information in the second candidate set (that is, the third candidate motion information in the motion information list) as the second target motion information of the second triangle sub-block.

In summary, if the first index value (candIdx1) is 11, that is, it corresponds to the index value 4 of the motion information list, the decoding process of the second index value (candIdx2) may be shown in Table 2. In summary, if the first index value (candIdx1) is not 11, that is, it does not correspond to the index value 4 of the motion information list, the decoding process of the second index value (candIdx2) may be shown in Table 3.

TABLE 2

| Received codeword | | | Second index value |
| --- | --- | --- | --- |
| 0 | — | — | 0 (corresponding to index value 0) |
| 1 | 0 | — | 1 (corresponding to index value 1) |
| 1 | 1 | 0 | 110 (corresponding to index value 2) |
| 1 | 1 | 1 | 111 (corresponding to index value 3) |

TABLE 3

| Received codeword | | Second index value |
| --- | --- | --- |
| 0 | — | 0 |
| 1 | 0 | 10 |
| 1 | 1 | 11 |

In an example, the second index value (candIdx2) may first be encoded, since the second index value (candIdx2) may only correspond to index value 0, index value 1, index value 2, index value 3. Therefore, 0, 10, 110, 111 may be used for encoding, that is, the second index value (candIdx2) may be encoded with at most 3 binary bits. For example, the index value 0 is encoded by 0, the index value 1 is encoded by 10, and the index value 2 is encoded by 110, and the index value 3 is encoded by 111. Then, the first index value (candIdx1) may be encoded, that is, candIdx1−=candIdx1<candIdx2?0:1, that is, the first index value (candIdx1) is the remaining four of index value 0, index value 1, index value 2, index value 3 and index value 4 except for the second index value (candidx2). Therefore, 0, 10, 110, 111 may also be used for encoding, that is, at most 3 binary bits are used to encode the first index value (candIdx1). Obviously, in this way, there is no need to rely on the size of the previous index value to determine how many binary bits currently need to be decoded, thereby reducing the dependence on parsing.

In an example, when splitDir=1, the second index value (candIdx2) may be encoded first, and then the first index value (candIdx1) may be encoded. When splitDir=0, the first index value (candIdx1) may be encoded first, and the second index value (candIdx2) may be encoded later; or the second index value (candIdx2) may be encoded first, and then the first index value (candIdx1) may be encoded.

In an example, when splitDir=0, embodiment 12 may be used for processing, and when splitDir=1, embodiment 13 may be used for processing. Of course, the embodiment 12 and embodiment 13 above are only examples, and there is no limitation on this.

In an example, the foregoing examples of index value encoding only illustrates that the motion information list includes 5 pieces of candidate motion information. When the motion information list includes candidate motion information of other examples, the implementation is similar, and details are not repeated here.

Embodiment 14: in the above examples, when the encoding end sends an encoded bit stream to the decoding end, the encoded bit stream may include second indication information, which is used to indicate the first index value of the first target motion information in the motion information list, and the second index value of the second target motion information in the motion information list. In an example, for the first index value, the encoding end may use the CABAC mode to encode the first index value, and the decoding end may use the CABAC mode to decode the first index value. For the second index value, the encoding end may use the CABAC mode to encode the second index value, and the decoding end may use the CABAC mode to decode the second index value. Of course, CABAC is only an example, and there is no limitation on this.

Exemplarily, assuming that the motion information list includes 5 pieces of candidate motion information, the first index value (denoted as candIdx1) may be represented by four binary bits, and the second index value (denoted as candIdx2) may be represented by four binary bits.

At the encoding end, if candIdx1 represents the first candidate motion information in the motion information list, the first binary bit is encoded in the CABAC mode, and the first binary bit is 0. If candIdx1 represents the second candidate motion information in the motion information list, the first binary bit and the second binary bit are encoded in CABAC mode, and the first binary bit is 1 and the second binary bit is 0. If candIdx1 represents the third candidate motion information in the motion information list, the first binary bit, the second binary bit, and the third binary bit are encoded in CABAC mode, and the first binary bit is 1, the second binary bit is 1, and the third binary bit is 0. If candIdx1 represents the fourth candidate motion information in the motion information list, the first binary bit, the second binary bit, the third binary bit, and the fourth binary bit are encoded in CABAC mode, and the first binary bit is 1, the second binary bit is 1, the third binary bit is 1, and the fourth binary bit is 0. If candIdx1 represents the fifth candidate motion information in the motion information list, the first binary bit, the second binary bit, the third binary bit, and the fourth binary bit are encoded in CABAC mode, and the first binary bit is 1, the second binary bit is 1, the third binary bit is 1, and the fourth binary bit is 0.

At the decoding end, the first binary bit of candIdx1 is decoded through CABAC mode. If the first binary bit is 0, it is determined that candIdx1 corresponds to 0, and candIdx1 represents the first candidate motion information in the motion information list. If the first binary bit is 1, the second binary bit of candIdx1 is decoded through CABAC mode. If the second binary bit is 0, it is determined that candIdx1 corresponds to 1 (represented as 10), and candIdx1 represents the first candidate motion information in the motion information list. If the first binary bit is 2, the third binary bit of candIdx1 is decoded through CABAC mode. If the third binary bit is 0, it is determined that candIdx1 corresponds to 2 (represented as 110), and candIdx1 represents the third candidate motion information in the motion information list. If the first binary bit is 3, the fourth binary bit of candIdx1 is decoded through CABAC mode. If the fourth binary bit is 0, it is determined that candIdx1 corresponds to 3 (represented as 1110), and candIdx1 represents the fourth candidate motion information in the motion information list. If the fourth binary bit is 1, since the number of binary bit reaches the maximum, therefore, it is determined that candIdx1 corresponds to 4 (represented as 1111), and candIdx1 represents the fifth candidate motion information in the motion information list.

In an example, in the decoding process, the end condition may be: the solved binary bit is 0, or the number of the solved binary bit reaches the maximum (numCandminus1), numCandminus1 may be obtained through syntax information, and there is no limitation on this. If numCandminus1 is 4, it indicates that the maximum number of binary bit of the first index value candIdx1 is 4.

In the above embodiment, the encoding process of candIdx1 by the encoding end and the decoding process of candIdx1 by the decoding end are introduced. The encoding process and decoding process of candIdx2 are similar to the above embodiment, and will not be repeated here.

For the above examples, the binary bit corresponding to candIdx1/candIdx2 is shown in Table 4.

TABLE 4

| Index value corresponding to candIdx1/candIdx2 | First binary bit | Second binary bit | Third binary bit | Fourth binary bit |
|---|---|---|---|---|
| 0 | 0 | | | |
| 1 | 1 | 0 | | |
| 2 | 1 | 1 | 0 | |
| 3 | 1 | 1 | 1 | 0 |
| 4 | 1 | 1 | 1 | 1 |

Embodiment 15: in the above example, when the encoding end sends an encoded bit stream to the decoding end, the encoded bit stream may include second indication information, which is used to indicate the first index value of the first target motion information in the motion information list, and the second index value of the second target motion information in the motion information list. In an example, for the first index value, the encoding end may use the CABAC mode to encode the first index value, and the decoding end may use the CABAC mode to decode the first index value. For the second index value, the encoding end may use the CABAC mode to encode the second index value, and the decoding end may use the CABAC mode to decode the second index value. Of course, CABAC is only an example, and there is no limitation on this.

CABAC includes a CABAC mode that stores and updates at least one context model (that is, the adaptive binary arithmetic encoding of the context), and a bypass CABAC mode that does not store and update the context model (that is, the bypass mode binary arithmetic encoding). The first index value is encoded in a bypass-based binary arithmetic coding method, or the first index value is encoded in a context-based adaptive binary arithmetic coding method. That is, the first index value is encoded in a context-based adaptive binary arithmetic coding method according to the context model. The second index value is encoded in a bypass-based binary arithmetic coding method, or the second index value is encoded in a context-based adaptive binary arithmetic coding method. That is, the second index value is encoded in a context-based adaptive binary arithmetic coding method according to the context model.

When the encoding end uses the CABAC mode to encode the first index value, the decoding end may use the CABAC mode to decode the first index value. For example, when the encoding end encodes the first index value in the bypass-based binary arithmetic coding method, the decoding end decodes the first index value in the bypass-based binary arithmetic decoding method, to obtain the first index value. When the encoding end encodes the first index value in a context-based adaptive binary arithmetic coding method, the decoding end decodes the first index value in the context-based adaptive binary arithmetic coding method, to obtain the first index value. That is, according to the context model, the first index value is decoded in the context-based adaptive binary arithmetic coding method to obtain the first index value.

When the encoding end uses the CABAC mode to encode the second index value, the decoding end may use the CABAC mode to decode the second index value. For example, when the encoding end encodes the second index value in the bypass-based binary arithmetic coding method, the decoding end decodes the second index value in the bypass-based binary arithmetic decoding method, to obtain the second index value. When the encoding end encodes the second index value in a context-based adaptive binary arithmetic coding method, the decoding end decodes the second index value in the context-based adaptive binary arithmetic coding method, to obtain the second index value. That is, according to the context model, the second index value is decoded in the context-based adaptive binary arithmetic coding method to obtain the second index value.

In an example, the first index value may include M1 binary bits, N1 binary bits in the M1 binary bits are obtained through the context-based adaptive binary arithmetic decoding, the remaining (M1−N1) binary bits in M1 binary bits are obtained through the bypass-based binary arithmetic decoding; M1 is greater than or equal to N1. For example, the first index value includes four binary bits, the first binary bit is obtained through the context-based adaptive binary arithmetic decoding that is performed based on context model, the second, third, fourth binary bits are obtained through the bypass-based binary arithmetic decoding.

For example, for the first binary bit in the first index value, the encoding end encodes the first binary bit in the context-based adaptive binary arithmetic coding method according to the context model. The decoding end decodes the first binary bit in the context-based adaptive binary arithmetic coding method according to the context model, to obtain the first binary bit.

If there are other binary bits in the first index value (such as the second binary bit, the third binary bit, the fourth binary bit, etc.), the encoding end encodes the other binary bits in the bypassed-based binary arithmetic coding method. The decoding end decodes other binary bits in the bypassed-based binary arithmetic decoding method, to obtain other binary bits.

In summary, for the first binary bit, the encoding end/decoding end may use the CABAC mode that updates a certain context model for encoding/decoding. For other binary bits, the encoding end/decoding end may use the CABAC mode that does not update the context model for encoding/decoding, that is, it may use the CABAC mode in Bypass mode.

In an example, the second index value may include M2 binary bits, N2 binary bits in the M2 binary bits are obtained through the context-based adaptive binary arithmetic decoding, the remaining (M2−N2) binary bits in M2 binary bits are obtained through the bypass-based binary arithmetic decoding; M2 is greater than or equal to N2. For example, the second index value includes four binary bits, the first binary bit is obtained through the context-based adaptive binary arithmetic decoding that is performed based on context model, the second, third, fourth binary bits are obtained through the bypass-based binary arithmetic decoding.

For example, for the first binary bit in the second index value, the encoding end encodes the first binary bit in the context-based adaptive binary arithmetic coding method according to the context model. The decoding end decodes the first binary bit in the context-based adaptive binary arithmetic coding method according to the context model, to obtain the first binary bit.

If there are other binary bits in the second index value (such as the second binary bit, the third binary bit, the fourth binary bit, etc.), the encoding end encodes the other binary bits in the bypassed-based binary arithmetic coding method. The decoding end decodes other binary bits in the bypassed-based binary arithmetic decoding method, to obtain other binary bits.

In summary, for the first binary bit, the encoding end/decoding end may use the CABAC mode that updates a certain context model for encoding/decoding. For other binary bits, the encoding end/decoding end may use the CABAC mode that does not update the context model for encoding/decoding, that is, it may use the CABAC mode in Bypass mode.

Embodiment 16: the context model corresponding to the first index value is the same as the context model corresponding to the second index value. Alternatively, the context model corresponding to the first index value is different from the context model corresponding to the second index value. Alternatively, the context model corresponding to the first index value and the first division information is the same as the context model corresponding to the second index value and the first division information; the context model corresponding to the first index value and the second division information is the same as the context model corresponding to the second index value and the second division information; the context model corresponding to the first index value and the first division information is different from the context model corresponding to the first index value and the second division information. Alternatively, the context model corresponding to the first index value and the first division information, the context model corresponding to the second index value and the first division information, the context model corresponding to the first index value and the second division information, the context model corresponding to the second index value and the second division information are all different. Alternatively, the context model corresponding to the first index value and the first division information is different from the context model corresponding to the second index value and the first division information; the context model corresponding to the first index value and the second division information is the same as the context model corresponding to the second index value and the second division information. Alternatively, the context model corresponding to the first index value and the first division information is the same as the context model corresponding to the second index value and the first division information; the context model corresponding to the first index value and the second division information is different from the context model corresponding to the second index value and the second division information. In an example, The first division information indicates that the division information of the triangle sub-block is a leading diagonal division method; the second division information indicates that the division information of the triangle sub-block is a sub-diagonal division method.

The following is a detailed description of the above context model in conjunction with several specific application scenes.

Application scene 1: the encoding end/decoding end may maintain the context model $A1_{Model}$. The context model corresponding to the first index value (an index value used to indicate the first target motion information of the first triangle sub-block in the geometric partitioning mode with triangular partition) is the context model $A1_{Model}$, the context model corresponding to the second index value (an index value used to indicate the second target motion information of the second triangle sub-block in the geometric partitioning mode with triangular partition) is the context model $A11_{Model}$, and the context model corresponding to the index value of the regular merge mode is the context model $A1_{Model}$.

In an example, if the encoding end/decoding end requires to encode or decode the first index value according to the context model, the context model $A1_{Model}$ is used to encode or decode the first index value (such as the first binary bit of the first index value). If the encoding end/decoding end requires to encode or decode the second index value according to the context model, the context model $A1_{Model}$ is used to encode or decode the second index value (such as the second binary bit of the first index value). If the encoding end/decoding end requires to encode or decode the index value of the regular merge mode according to the context model, the context model $A1_{Model}$ is used to encode or decode the index value of the regular merge mode (such as the first binary bit of the index value of the regular merge mode).

Application scene 2: the encoding end/decoding end may maintain the context model $B1_{Model}$ and the context model $B2_{Model}$. The context model corresponding to the first index value is the context model $B1_{Model}$, the context model corresponding to the second index value is the context model $B1_{Model}$, and the context model corresponding to the index value of the regular merge mode is the context model $B2_{Model}$.

In an example, if the encoding end/decoding end requires to encode or decode the first index value according to the context model, the context model $B1_{Model}$ is used to encode or decode the first index value (such as the first binary bit of the first index value). If the encoding end/decoding end requires to encode or decode the second index value according to the context model, the context model $B1_{Model}$ is used to encode or decode the second index value (such as the second binary bit of the first index value). If the encoding end/decoding end requires to encode or decode the index value of the regular merge mode according to the context model, the context model $B2_{Model}$ is used to encode or decode the index value of the regular merge mode (such as the first binary bit of the index value of the regular merge mode).

Application scene 3: the encoding end/decoding end may maintain the context model C1, the context model C2, and the context model C3. The context model corresponding to the first index value is the context model C1, the context model corresponding to the second index value is the context model C2, and the context model corresponding to the index value of the regular merge mode is the context model C3.

In an example, if the encoding end/decoding end requires to encode or decode the first index value according to the context model, the context model C1 is used to encode or decode the first index value (such as the first binary bit of the first index value). If the encoding end/decoding end requires to encode or decode the second index value according to the context model, the context model C2 is used to encode or decode the second index value (such as the second binary bit of the first index value). If the encoding end/decoding end requires to encode or decode the index value of the regular merge mode according to the context model, the context model C3 is used to encode or decode the index value of the regular merge mode (such as the first binary bit of the index value of the regular merge mode).

Application scene 4: the encoding end/decoding end may maintain the context model D1, the context model D2, and the context model D3. In an example, the context model corresponding to the first index value and the first division information is the context model D1; the context model corresponding to the second index value and the first division information is the context model D1. The context model corresponding to the first index value and the second division information is the context model D2; the context model corresponding to the second index value and the second division information is the context model D2. The context model corresponding to the index value of the regular merge mode (such as regular merge mode) is the context model D3.

In an example, if the encoding end/decoding end requires to encode or decode the first index value according to the context model, the division information of the triangle sub-block is determined first; if the division information of the triangle sub-block is the first division information (indicating that the current block is divided into the first triangle sub-block and the second triangle sub-block according to the leading diagonal (included angle of 45 degrees from the horizontal right direction)), the context model D1 is used to encode or decode the first index value (such as the first binary bit of the first index value); if the division information of the triangle sub-block is the second division information (indicating that the current block is divided into the first triangle sub-block and the second triangle sub-block according to the sub-diagonal (included angle of 135 degrees from the horizontal right direction)), the context model D2 is used to encode or decode the first index value (such as the first binary bit of the first index value). If the encoding end/decoding end requires to encode or decode the second index value according to the context model, the division information of the triangle sub-block is determined first; if the division information of the triangle sub-block is the first division information, the context model D1 is used to encode or decode the second index value (such as the first binary bit of the second index value); if the division information of the triangle sub-block is the second division information, the context model D2 is used to encode or decode the second index value (such as the first binary bit of the second index value); if the encoding end/decoding end requires to encode or decode the index value of the regular merge mode according to the context model, the context model D3 is used to encode or decode the index value of the regular merge mode (such as the first binary bit of the index value of the regular merge mode).

Application scene 5: the encoding end/decoding end may maintain the context model E1, the context model E2, the context model E3, the context model E4, and the context model E5. In an example, the context model corresponding to the first index value and the first division information is the context model E1; the context model corresponding to the first index value and the second division information is the context model E2; the context model corresponding to the second index value and the first division information is the context model E3; the context model corresponding to the second index value and the second division information is the context model E4. The context model corresponding to the index value of the regular merge mode (such as regular merge mode) is the context model E5.

In an example, if the encoding end/decoding end encodes or decodes the first index value according to the context model, the division information of the triangle sub-block is determined; if the division information of the triangle sub-block is the first division information, the context model E1 is used to encode or decode the first index value (such as the first binary bit of the first index value); if the division information of the triangle sub-block is the second division information, the context model E2 is used to encode or decode the first index value (such as the first binary bit of the first index value). If the encoding end/decoding end needs to encode or decode the second index value according to the context model, the division information of the triangle sub-block is determined first; if the division information of the triangle sub-block is the first division information, the context model E3 is used to encode or decode the second index value (such as the first binary bit of the second index value); if the division information of the triangle sub-block is the second division information, the context model E4 is used to encode or decode the second index value (such as the first binary bit of the second index value); if the encoding end/decoding end requires to encode or decode the index value of the regular merge mode according to the context model, the context model E5 is used to encode or decode the index value of the regular merge mode (such as the first binary bit of the index value of the regular merge mode).

Application scene 6: the encoding end/decoding end may maintain the context model F1, the context model F2, the context model F3, and the context model F4. In an example, the context model corresponding to the first index value and the first division information may be the context model F1; the context model corresponding to the second index value and the first division information may be the context model F2. The context model corresponding to the first index value and the second division information may be the context model F3; the context model corresponding to the second index value and the second division information may be the context model F3. The context model corresponding to the index value of the regular merge mode (such as regular merge mode) is the context model F4.

In an example, if the encoding end/decoding end encodes or decodes the first index value according to the context model, the division information of the triangle sub-block is determined; if the division information of the triangle sub-block is the first division information, the context model F1 is used to encode or decode the first index value (such as the first binary bit of the first index value); if the division information of the triangle sub-block is the second division information, the context model F3 is used to encode or decode the first index value (such as the first binary bit of the first index value). If the encoding end/decoding end requires to encode or decode the second index value according to the context model, the division information of the triangle sub-block is determined first; if the division information of the triangle sub-block is the first division information, the context model F2 is used to encode or decode the second index value (such as the first binary bit of the second index value); if the division information of the triangle sub-block is the second division information, the context model F3 is used to encode or decode the second index value (such as the first binary bit of the second index value); if the encoding end/decoding end requires to encode or decode the index value of the regular merge mode according to the context model, the context model F4 is used to encode or decode the index value of the regular merge mode (such as the first binary bit of the index value of the regular merge mode).

Application scene 7: the encoding end/decoding end may maintain the context model G1, the context model G2, the context model G3, and the context model G4. In an example, the context model corresponding to the first index value and the first division information may be the context model G1; the context model corresponding to the second index value and the first division information may be the context model G1. The context model corresponding to the first index value and the second division information may be the context model G2; the context model corresponding to the second index value and the second division information may be the context model G3. The context model corresponding to the index value of the regular merge mode (such as regular merge mode) is the context model G4.

If the encoding end/decoding end encodes or decodes the first index value according to the context model, the division information of the triangle sub-block is determined; if the division information of the triangle sub-block is the first division information, the context model G1 is used to encode or decode the first index value (such as the first binary bit of the first index value); if the division information of the triangle sub-block is the second division information, the context model G2 is used to encode or decode the first index value (such as the first binary bit of the first index value). If the encoding end/decoding end requires to encode or decode the second index value according to the context model, the division information of the triangle sub-block is determined first; if the division information of the triangle sub-block is the first division information, the context model G1 is used to encode or decode the second index value (such as the first binary bit of the second index value); if the division information of the triangle sub-block is the second division information, the context model G3 is used to encode or decode the second index value (such as the first binary bit of the second index value); if the encoding end/decoding end requires to encode or decode the index value of the regular merge mode according to the context model, the context model G4 is used to encode or decode the index value of the regular merge mode (such as the first binary bit of the index value of the regular merge mode).

Embodiment 17: the encoding end encodes the division information of the triangle sub-block first, and then encodes the first index value and the second index value. The decoding end decodes the division information of the triangle sub-block first, and then decodes the first index value and the second index value. Alternatively, the encoding end encodes the first index value and the second index value, and then encodes the division information of the triangle sub-block. The decoding end decodes the first index value and the second index value, and then decodes the division information of the triangle sub-block.

Embodiment 18: at step 305 and step 405, the encoding end/decoding end performs motion compensation on the first triangle sub-block based on the first target motion information to obtain the prediction value of the first triangle sub-block, and performs motion compensation on the second triangle sub-block based on the second target motion information to obtain the prediction value of the second triangle sub-block. The above process is also the motion compensation process.

In an example, the current block may be divided into multiple sub-blocks. For each of the sub-blocks, if a sub-block is located in the first triangle sub-block, the motion compensation is performed on the sub-block based on the first target motion information; if a sub-block is located in the second triangle sub-block, the motion compensation is performed on the sub-block based on the second target motion information; if a sub-block is located in the first triangle sub-block and the second triangle sub-block at the same time, weighted motion compensation (also be called weighted prediction compensation) is performed on the sub-block based on the first target motion information and the second target motion information.

In an example, the current block may be divided into a first area sub-block, a second area sub-block, and a third area sub-block; the first area sub-block is located in the first triangle sub-block, and the second area sub-block is located in the second triangle sub-block. The vertical distance between the center of each sub-block in the third area sub-block and the diagonal dividing the first triangle sub-block and the second triangle sub-block is less than a preset threshold; motion compensation is performed on the first area sub-block based on the first target motion information; motion compensation is performed on the second area sub-block based on the second target motion information; weighted motion compensation is performed on the third area sub-block based on the first target motion information and the second target motion information. For example, for each sub-block in the third area sub-block, the first prediction value of the sub-block is determined based on the first target motion information; the second prediction value of the sub-block is determined based on the second target motion information; the weight compensation is performed on the sub-block based on a first prediction value, a first weight coefficient corresponding to the first prediction value, a second prediction value, and a second weight coefficient corresponding to the second prediction value. For example, if the sub-block is located in the first triangle sub-block, the first weight coefficient is greater than the second weight coefficient; if the sub-block is located in the second triangle sub-block, the first weight coefficient is less than the second weight coefficient; if the sub-block is located on a diagonal, the first weight coefficient is equal to the second weight coefficient. Wherein, "the sub-block is located on a diagonal" means that the center of the sub-block falls on the diagonal.

Referring to FIG. 7D, for the sub-block of Z1 area (i.e., the first area sub-block), the sub-block of the Z1 area is located in the first triangle sub-block, and the first target motion information of the first triangle sub-block is used for performing the motion compensation on the sub-block of the Z1 area to obtain the prediction value, and there is no limitation on the motion compensation process. For the sub-block of Z2 area (i.e., the second area sub-block), the sub-block of the Z2 area is located in the second triangle sub-block, and the second target motion information of the second triangle sub-block is used for performing the motion compensation on the sub-block of the Z2 area to obtain the prediction value, and there is no limitation on the motion compensation process. For sub-blocks in areas other than Z1 area and Z2 area (that is, the sub-block of the third area), including the sub-block marked as 1 (denoted as sub-block 1), and the sub-block marked as 2 (denoted as sub-block 2)), the sub-block marked as 3 (denoted as sub-block 3), the sub-block marked as 4 (denoted as sub-block 4), the sub-block marked as 5 (denoted as sub-block 5), the sub-block marked as 6 (denoted as sub-block 6), and the sub-block marked as 7 (denoted as sub-block 7).

For each sub-block 7 marked as 7, the prediction value P1 of the sub-block 7 may be determined based on the first target motion information, and the prediction value P2 of the sub-block 7 may be determined based on the second target motion information, assuming the first weight coefficient of the prediction value P1 is a, and the second weight coefficient of the predicted value P2 is b, then the weighted motion compensation is performed on the sub-block 7, and the prediction value after weighted motion compensation may be: $P_1*a+P_2*b$. Since the sub-block 7 is located in the first triangle sub-block, the first weight coefficient a is greater than the second weight coefficient b. Assuming that a is 7/8 and b is 1/8, the prediction value after weighted motion compensation is $P_1*7/8+P_2*1/8$.

For each sub-block 6 denoted as 6, refer to sub-block 7 for its processing process, which will not be repeated here. Since the sub-block 6 is located in the first triangular sub-block, the first weight coefficient a is greater than the second weight coefficient b, and since the sub-block 6 is closer to P2 area than the sub-block 7, therefore, the first weight coefficient a of the sub-block 6 may be smaller than the first weight coefficient a of the sub-block 7. For example, the first weight coefficient a of the sub-block 6 is 6/8 and b is 2/8, then the prediction value after weighted motion compensation is $P_1*6/8+P_2*2/8$.

For each sub-block 5 marked as 5, refer to sub-block 7 for its processing process, which will not be repeated here. The first weight coefficient a of the sub-block 5 is 5/8, and the second weight coefficient b of the sub-block 5 is 3/8, then the prediction value after weighted motion compensation is $P_1*8/8+P_2*3/8$.

For each sub-block 4 marked as 4, refer to sub-block 7 for its processing process, which will not be repeated here. Since the sub-block 4 is located on the diagonal, the first weight coefficient a may be equal to the second weight coefficient b. For example, the first weight coefficient a of the sub-block 4 is 4/8, and the second weight coefficient b of the sub-block 4 is 4/8, then the prediction value after weighted motion compensation is $P_1*4/8+P_2*4/8$.

For each sub-block 3 marked as 3, refer to sub-block 7 for its processing process, which will not be repeated here. The first weight coefficient a of the sub-block 3 is 3/8, and the second weight coefficient b of the sub-block 3 is 5/8, then the prediction value after weighted motion compensation is $P_1*3/8+P_2*5/8$.

For each sub-block 2 marked as 2, refer to sub-block 7 for its processing process, which will not be repeated here. Since the sub-block 2 is located in the second triangle sub-block, the first weight coefficient a may be less than the second weight coefficient b. For example, the first weight coefficient a of the sub-block 2 is 2/8, and the second weight coefficient b of the sub-block 2 is 6/8, then the prediction value after weighted motion compensation is $P_1*2/8+P_2*6/8$.

For each sub-block 1 marked as 1, refer to sub-block 7 for its processing process, which will not be repeated here. Since the sub-block 1 is located in the second triangle sub-block, the first weight coefficient a is smaller than the second weight coefficient b. Since the sub-block 2 is closer to P2 area than the sub-block 2, therefore, the first weight coefficient a of the sub-block 1 may be smaller than the first weight coefficient a of the sub-block 2. For example, the first weight coefficient a of the sub-block 1 is 1/8 and b is 7/8, then the prediction value after weighted motion compensation is $P_1*1/8+P_2*7/8$.

In summary, this embodiment proposes a set of weight coefficients for luma component. In the direction from the Z1 area to the Z2 area, the first weight coefficient a of each sub-block is {7/8, 6/8, 5/8, 4/8, 3/8, 2/8, 1/8}. For example, the first weight coefficient a of sub-block 7 is 7/8, the first weight coefficient a of sub-block 6 is 6/8, the first weight coefficient a of sub-block 5 is 5/8, the first weight coefficient a of sub-block 4 is 4/8, the first weight coefficient a of sub-block 3 is 3/8, the first weight coefficient a of sub-block 2 is 2/8, and the first weight coefficient a of sub-block 1 is 1/8. The above luma component means that the prediction value P1 is a luma prediction value, the prediction value P2 is a luma prediction value, and the prediction value after weight compensation P1*a+P2*b is also a luma prediction value.

As shown in FIG. 7D, this embodiment proposes a set of weight coefficients for chroma component. In the direction from the Z1 area to the Z2 area, the first weight coefficient a of each sub-block is {6/8, 4/8, 2/8}. For example, the first weight coefficient a of sub-block 6 is 6/8, the first weight coefficient a of sub-block 4 is 4/8, and the first weight coefficient a of sub-block 2 is 2/8. The above chroma component means that the prediction value P1 is a chroma prediction value, the prediction value P2 is a chroma prediction value, and the prediction value after weight compensation is also a chroma prediction value.

Embodiment 19: at step 306 and step 406, the encoding end/decoding end stores the motion information of the current block. The first target motion information is stored for the sub-block in the first triangle sub-block, on which non-weighted prediction compensation is performed; the second target motion information is stored for the sub-block in the second triangle sub-block, on which non-weighted prediction compensation is performed; the first target motion information, the second target motion information or the bidirectional motion information are stored for the sub-block, on which weighted prediction compensation is performed.

As shown in FIG. 7E, assuming that block 2, block 3, block 4, block 7, block 8, and block 12 are sub-blocks in the first triangle sub-block, on which non-weighted prediction compensation is performed, then the first target motion information (that is, the first target motion information of the first triangle sub-block) may be stored for block 2, block 3, block 4, block 7, block 8, and block 12. Assuming that block 5, block 9, block 10, block 7, block 14, and block 15 are sub-blocks in the second triangle sub-block, on which non-weighted prediction compensation is performed, then the second target motion information (that is, the second target motion information of the second triangle sub-block) may be stored for block 5, block 9, block 10, block 13, block 14, and block 15. Assuming that block 1, block 6, block 11, and block 16 are sub-blocks, on which weighted prediction compensation is performed, then the first target motion information, second target motion information, or bidirectional motion information may be stored for block 1, block 6, block 11, and block 16, the specific storage method may refer to the subsequent embodiments.

As shown in FIG. 7F, assuming that block 1, block 2, block 3, block 5, block 6, and block 9 are sub-blocks in the first triangle sub-block, on which non-weighted prediction compensation is performed, then the first target motion information (that is, the first target motion information of the first triangle sub-block) may be stored for block 1, block 2, block 3, block 5, block 6, and block 9. Assuming that block 8, block 11, block 12, block 14, block 15, and block 16 are sub-blocks in the second triangle sub-block, on which non-weighted prediction compensation is performed, then the second target motion information (that is, the second target motion information of the second triangle sub-block) may be stored for block 8, block 11, block 12, block 14, block 15, and block 16. Assuming that block 4, block 7, block 10, and block 13 are sub-blocks, on which weighted prediction compensation is performed, then the first target motion information, second target motion information, or bidirectional motion information may be stored for block 4, block 7, block 10, and block 13, the specific storage method may refer to the subsequent embodiments.

In an example, the motion information may be stored for each sub-block with a size of 4*4. Of course, the size of the sub-block is not limited.

Embodiment 20: the first target motion information is stored for the sub-block in the first triangle sub-block, on which non-weighted prediction compensation is performed; the second target motion information is stored for the sub-block in the second triangle sub-block, on which non-weighted prediction compensation is performed; the first target motion information or the second target motion information is stored for the sub-block, on which weighted prediction compensation is performed.

Application scene 1: storing directly the first target motion information for the sub-block, on which weighted prediction compensation is performed.

Application scene 2: storing directly the second target motion information for the sub-block, on which weighted prediction compensation is performed.

Application scene 3: storing the first target motion information or the second target motion information for the sub-block, on which weighted prediction compensation is performed, according to the division direction of the current block (such as the leading diagonal direction or the sub-diagonal direction).

In an example, if the dividing direction of the current block is the sub-diagonal direction (included angle of 135 degrees from the horizontal right direction), the first target motion information is stored for the sub-block. If the dividing direction of the current block is the leading diagonal direction (included angle of 45 degrees from the horizontal right direction), the second target motion information is stored for the sub-block. Or, if the dividing direction of the current block is the sub-diagonal direction (included angle of 135 degrees from the horizontal right direction), the second target motion information is stored for the sub-block. If the dividing direction of the current block is the leading diagonal direction (included angle of 45 degrees from the horizontal right direction), the first target motion information is stored for the sub-block.

Application scene 4: storing the first target motion information or the second target motion information for the sub-block, on which weighted prediction compensation is performed, according to the position of the sub-block (such as the sub-block on the diagonal, above the diagonal, below the diagonal, etc.).

In an example, if the sub-block is on the diagonal or above the diagonal, the first target motion information is stored for the sub-block; if the sub-block is below the diagonal, the second target motion information is stored for the sub-block. Or, if the sub-block is on the diagonal or below the diagonal, the second target motion information is stored for the sub-block; if the sub-block is above the diagonal, the first target motion information is stored for the sub-block. Or, if the sub-block is on the diagonal or above the diagonal, the second target motion information is stored for the sub-block; if the sub-block is below the diagonal, the first target motion information is stored for the sub-block. Or, if the sub-block is on the diagonal or below the diagonal, the first target motion information is stored for the sub-block; if the sub-block is above the diagonal, the second target motion information is stored for the sub-block.

Application scene 5: the first target motion information or the second target motion information may be stored for the sub-block, on which weighted prediction compensation is performed, according to the position of the sub-block (for example, the sub-block on the diagonal, above the diagonal, below the diagonal, etc.) and the division direction of the current block (for example, the leading diagonal direction or the sub-diagonal direction).

In an example, if the sub-block is on a diagonal, the first target motion information or the second target motion information may be stored for the sub-block based on the division direction of the current block. For example, if the dividing direction of the current block is the sub-diagonal direction, the first target motion information is stored for the sub-block. If the dividing direction of the current block is the leading diagonal direction, the second target motion information is stored for the sub-block. Or, if the dividing direction of the current block is the sub-diagonal direction, the second target motion information is stored for the sub-block. If the dividing direction of the current block is the leading diagonal direction, the first target motion information is stored for the sub-block.

In an example, if the sub-block is above the diagonal, the first target motion information is stored for the sub-block.

In an example, if the sub-block is below the diagonal, the second target motion information is stored for the sub-block.

Embodiment 21: the first target motion information is stored for the sub-block in the first triangle sub-block, on which non-weighted prediction compensation is performed; the second target motion information is stored for the sub-block in the second triangle sub-block, on which non-weighted prediction compensation is performed; the first target motion information, the second target motion information or the unidirectional motion information (the unidirectional motion information composed of the first target motion information and the second target motion information) are stored for the sub-block, on which weighted prediction compensation is performed.

Application scene 1: for the sub-block, on which weighted prediction compensation is performed, if the first target motion information and the second target motion information are derived from different lists, the first target motion information and the second target motion information are directly merged into bidirectional motion information, the bidirectional motion information (that is, bidirectional motion information composed of the first target motion information and the second target motion information) is stored for the sub-block. If the first target motion information and the second target motion information are derived from the same list, the first target motion information is stored for the sub-block.

Application scene 2: for the sub-block, on which weighted prediction compensation is performed, if the first target motion information and the second target motion information are derived from different lists, the first target motion information and the second target motion information are directly merged into bidirectional motion information, the bidirectional motion information (that is, bidirectional motion information composed of the first target motion information and the second target motion information) is stored for the sub-block. If the first target motion information and the second target motion information are derived from the same list, the second target motion information is stored for the sub-block.

Application scene 3: for the sub-block, on which weighted prediction compensation is performed, if the first target motion information and the second target motion information are derived from different lists, the first target motion information and the second target motion information are directly merged into bidirectional motion information, the bidirectional motion information (that is, bidirectional motion information composed of the first target motion information and the second target motion information) is stored for the sub-block. If the first target motion information and the second target motion information are derived from the same list, the first target motion information or the second target motion information is stored for the sub-block according to the division direction of the current block (such as the leading diagonal direction or the sub-diagonal direction).

In an example, if the dividing direction of the current block is the sub-diagonal direction, the first target motion information may be stored for the sub-block. If the dividing direction of the current block is the leading diagonal direction, the second target motion information may be stored for the sub-block. Or, if the dividing direction of the current block is the sub-diagonal direction, the second target motion information may be stored for the sub-block. If the dividing direction of the current block is the leading diagonal direction, the first target motion information may be stored for the sub-block.

Application scene 4: for the sub-block, on which weighted prediction compensation is performed, if the first target motion information and the second target motion information are derived from different lists, the first target motion information and the second target motion information are directly merged into bidirectional motion information, the bidirectional motion information (that is, bidirectional motion information composed of the first target motion information and the second target motion information) is stored for the sub-block. If the first target motion information and the second target motion information are derived from the same list, the first target motion information or the second target motion information is stored for the sub-block according to the position of the sub-block (such as sub-block on the diagonal, above the diagonal, below the diagonal, etc.).

In an example, if the sub-block is on the diagonal or above the diagonal, the first target motion information is stored for the sub-block; if the sub-block is below the diagonal, the second target motion information is stored for the sub-block. Or, if the sub-block is on the diagonal or below the diagonal, the second target motion information is stored for the sub-block; if the sub-block is above the diagonal, the first target motion information is stored for the sub-block. Or, if the sub-block is on the diagonal or above the diagonal, the second target motion information is stored for the sub-block; if the sub-block is below the diagonal, the first target motion information is stored for the sub-block. Or, if the sub-block is on the diagonal or below the diagonal, the first target motion information is stored for the sub-block; if the sub-block is above the diagonal, the second target motion information is stored for the sub-block.

Application scene 5: for the sub-block, on which weighted prediction compensation is performed, if the first target motion information and the second target motion information are derived from different lists, the first target motion information and the second target motion information are directly merged into bidirectional motion information, the bidirectional motion information (that is, bidirectional motion information composed of the first target motion information and the second target motion information) is stored for the sub-block. If the first target motion information and the second target motion information are derived from the same list, the first target motion information or the second target motion information is stored for the sub-block according to the position of the sub-block (for example, the sub-block on the diagonal, above the diagonal, below the diagonal, etc.) and the division direction of the current block (for example, the leading diagonal direction or the sub-diagonal direction).

In an example, if the sub-block is on a diagonal, the first target motion information or the second target motion information may be stored for the sub-block based on the division direction of the current block. For example, if the dividing direction of the current block is the sub-diagonal direction, the first target motion information is stored for the sub-block. If the dividing direction of the current block is the leading diagonal direction, the second target motion information is stored for the sub-block. Or, if the dividing direction of the current block is the sub-diagonal direction, the second target motion information is stored for the sub-block. If the dividing direction of the current block is the leading diagonal direction, the first target motion information is stored for the sub-block.

In an example, if the sub-block is above the diagonal, the first target motion information is stored for the sub-block.

In an example, if the sub-block is below the diagonal, the second target motion information is stored for the sub-block.

Application scene 6: for the sub-block, on which weighted prediction compensation is performed, if the first target motion information and the second target motion information are derived from different lists, the first target motion information and the second target motion information are directly merged into bidirectional motion information, the bidirectional motion information (that is, bidirectional motion information composed of the first target motion information and the second target motion information) is stored for the sub-block. If the first target motion information and the second target motion information are derived from the same list, a mean value of the first target motion information and the second target motion information is stored for the sub-block, or the second target motion information is stored for the sub-block. For example, if the reference frame of the list corresponding to the first target motion information is the same as the reference frame of the list corresponding to the second target motion information, the mean value of the first target motion information and the second target motion information is stored for the sub-block.

In an example, the mean value of the first target motion information and the second target motion information may include: an average value of the first target motion information and the second target motion information, for example, the average value of a motion vector in the first target motion information and a motion vector in the second target motion information, in other words, the weights of the two may be the same. Or, a weighted average value of the first target motion information and the second target motion information, for example, a weighted average value of the first target motion information and the second target motion information, in other words, the weights of the two may be different with each other.

In an example, if the reference frame of the list corresponding to the first target motion information is the same as the reference frame of the list corresponding to the second target motion information, the mean value of the first target motion information and the second target motion information is stored for the sub-block. If the reference frame of the list corresponding to the first target motion information is different from the reference frame of the list corresponding to the second target motion information, the first target motion information or the second target motion information is stored for the sub-block according to the division direction of the current block (such as the leading diagonal direction or the sub-diagonal direction).

For example, if the dividing direction of the current block is the sub-diagonal direction, the first target motion information may be stored for the sub-block. If the dividing direction of the current block is the leading diagonal direction, the second target motion information may be stored for the sub-block. Or, if the dividing direction of the current block is the sub-diagonal direction, the second target motion information may be stored for the sub-block. If the dividing direction of the current block is the leading diagonal direction, the first target motion information may be stored for the sub-block.

Application scene 7: for the sub-block, on which weighted prediction compensation is performed, if the first target motion information and the second target motion information are derived from different lists, the first target motion information and the second target motion information are directly merged into bidirectional motion information, the bidirectional motion information is stored for the sub-block. If the first target motion information and the second target motion information are derived from the same list, the first target motion information or the second target motion information may be stored for the sub-block according to the size information of the current block.

In an example, if the width value and the height value of the current block are equal, the first target motion information or the second target motion information is stored for the sub-block according to the division direction of the current block. For example, if the dividing direction is the sub-diagonal direction, the first target motion information may be stored for the sub-block. If the dividing direction is the leading diagonal direction, the second target motion information may be stored for the sub-block. Or, if the dividing direction is the sub-diagonal direction, the second target motion information may be stored for the sub-block. If the dividing direction is the leading diagonal direction, the first target motion information may be stored for the sub-block.

In an example, if the width value and the height value of the current block are not equal, the first target motion information or the second target motion information is stored for the sub-block based on a width-to-height relationship. For example, if the height value of the current block is greater than the width value of the current block, the first target motion information is stored for the sub-block; if the height value of the current block is less than the width value of the current block, the second target motion information is stored for the sub-block.

Application scene 8: for the sub-block, on which weighted prediction compensation is performed, bidirectional motion information may be stored, the bidirectional motion information is derived by the following rules: if the first target motion information and the second target motion information are derived from different lists, the first target motion information and the second target motion information are directly merged into bidirectional motion information, the bidirectional motion information is stored for the sub-block. Otherwise, if the first target motion information and the second target motion information both are derived from a list, denoted as ListX (X=0/1), then:

- if the reference frame of the second target motion information is the same as a certain reference frame of List(1–X), the second target motion information is scaled to this reference frame, and the first target motion information and the scaled second target motion information is combined into the bidirectional motion information;
- if the reference frame of the first target motion information is the same as a certain reference frame of List(1–X), the first target motion information is scaled to this reference frame, and the second target motion information and the scaled first target motion information is combined into the bidirectional motion information;
- otherwise, these sub-blocks using weighted prediction compensation only store the first target motion information.

Embodiment 22: Based on the same inventive concept as the above method, an embodiment of the present application also proposes an encoding and decoding device, which is applied to an encoding end or an decoding end. FIG. 8 is a structural diagram of the apparatus, and the apparatus may include:

- a dividing module 81, configured for dividing, if characteristic information of a current block meets specific conditions, the current block into a first triangle sub-block and a second triangle sub-block; a constructing module 82, configured for constructing a motion information list for the current block, wherein the motion information list includes multiple pieces of candidate motion information; an acquisition module 83, configured for acquiring first target motion information of the first triangle sub-block and the second target motion information of the second triangle sub-block from the motion information list, wherein the first target motion information is different with the second target motion information; and an encoding and decoding module 84, configured for performing motion compensation on a first triangle sub-block based on the first target motion information to obtain a prediction value of the first triangle sub-block; performing motion compensation on a second triangle sub-block based on the second target motion information to obtain a prediction value of the second triangle sub-block.

In an example, the characteristic information includes one or more of: a motion information mode, size information, a slice type, and sequence-level switch control information.

The dividing module 81 is further configured for determining, if the characteristic information includes the motion information mode and the motion information mode meets at least one of the following conditions, that the motion information mode meets specific conditions;

- the motion information mode of the current block is a merge mode or a skip mode;
- the motion information mode of the current block is a merge mode or a skip mode, and the motion information mode of the current block is not any of other types of merge sub-modes or skip sub-modes except for the triangle prediction sub-mode;
- the motion information mode of the current block is a merge mode, and the motion information mode of the current block is not any one of a regular merge sub-mode, a MMVD sub-mode, a SB merge sub-mode, a CIIP sub-mode;
- the motion information mode of the current block is a skip mode, and the motion information mode of the current block is not any one of a regular merge sub-mode, a MMVD a sub-mode, a SB merge sub-mode.

The dividing module 81 is further configured for determining, if the characteristic information includes the slice type and the slice type meets at least one of the following conditions, that the slice type meets specific conditions;

- the slice type indicates that the current slice where the current block is located is a B slice;
- the slice type indicates that the current slice where the current block is located allows intra block copying.

The dividing module 81 is further configured for determining, if the characteristic information comprises the sequence-level switch control information, and the sequence-level switch control information allows the current block to use a geometric partitioning mode with triangular partition, that the sequence-level switch control information meets specific conditions.

The dividing module 81 is further configured for determining, if the characteristic information comprises the size information, and the size information meets at least one of the following conditions, that the size information meets specific conditions;

- a width value of the current block is greater than or equal to a first threshold, and is less than or equal to a second threshold;
- a height value of the current block is greater than or equal to a third threshold, and is less than or equal to a fourth threshold;
- an area value of the current block is greater than or equal to a fifth threshold, and is less than or equal to a sixth threshold;
- the area value of the current block is greater than or equal to a seventh threshold;
- the area value of the current block is less than or equal to a eighth threshold;
- the width value of the current block is less than or equal to a ninth threshold, and the height value of the current block is less than or equal to a tenth threshold.

When the encoding and decoding method is applied to a decoding end, for dividing the current block into a first triangle sub-block and a second triangle sub-block, the dividing module 81 is further configured for: acquiring first indication information from an encoded bit stream, wherein the first indication information is used to indicate division information of a triangle sub-block; dividing, if the division information of the triangle sub-block is a leading diagonal division mode, the current block into a first triangle sub-block and a second triangle sub-block according to the leading diagonal of the current block; and dividing, if the division information of the triangle sub-block is a sub-diagonal division mode, the current block into a first triangle sub-block and a second triangle sub-block according to the sub-diagonal of the current block.

In an example, the first indication information is obtained through bypass-based binary arithmetic decoding; or, the first indication information is obtained through context-based adaptive binary arithmetic decoding that is performed based on a context model.

For constructing a motion information list for the current block, the constructing module 82 is specifically configured for:

constructing a motion information list for the current block by using a manner of constructing a motion information list in a regular merge mode.

When the encoding and decoding method is applied to a decoding end, for acquiring the first target motion information of the first triangle sub-block and the second target motion of the second triangle sub-block from the motion information list, the acquisition module 83 is specifically configured for:

acquiring second indication information from an encoded bit stream, wherein the second indication information is used to indicate a first index value of the first target motion information in the motion information list and a second index value of the second target motion information in the motion information list;

acquiring, based on the second indication information, candidate motion information corresponding to the first index value from the motion information list, and determining the acquired candidate motion information corresponding to the first index value as the first target motion information of the first triangle sub-block; and acquiring, based on the second indication information, candidate motion information corresponding to the second index value from the motion information list, and determining the acquired candidate motion information corresponding to the second index value as the second target motion information of the second triangle sub-block.

The first index value is obtained through bypass-based binary arithmetic decoding; or, the first index value is obtained through context-based adaptive binary arithmetic decoding that is performed based on context model; the second index value is obtained through bypass-based binary arithmetic decoding; or, the second index value is obtained through context-based adaptive binary arithmetic decoding that is performed based on context model.

The first index value includes M1 binary bits, wherein N1 binary bits in the M1 binary bits are obtained through context-based adaptive binary arithmetic decoding, the remaining (M1–N1) binary bits in the M1 binary bits are obtained through the bypass-based binary arithmetic decoding; and wherein M1 is a positive integer greater than or equal to 1, N1 is a positive integer greater than or equal to 1, and M1 is greater than or equal to N1.

The second index value includes M2 binary bits, wherein N2 binary bits in the M2 binary bits are obtained through context-based adaptive binary arithmetic decoding, the remaining (M2-N2) binary bits in the M2 binary bits are obtained through the bypass-based binary arithmetic decoding; and wherein M2 is a positive integer greater than or equal to 1, N2 is a positive integer greater than or equal to 1, and M2 is greater than or equal to N1.

The context model corresponding to the first index value is the same as a context model corresponding to the second index value; or, the context model corresponding to the first index value is different with a context model corresponding to the second index value.

For acquiring, based on the second indication information, candidate motion information corresponding to the first index value from the motion information list, and determining the acquired candidate motion information corresponding to the first index value as the first target motion information of the first triangle sub-block, the acquisition module 83 is specifically configured for:

determining, if the first index value is an even number and the candidate motion information corresponding to the first index value includes unidirectional motion information corresponding to list0, the unidirectional motion information corresponding to list0 as the first target motion information of the first triangle sub-block;

determining, if the first index value is an even number and the candidate motion information corresponding to the first index value does not include unidirectional motion information corresponding to list0, the unidirectional motion information corresponding to list1 as the first target motion information of the first triangle sub-block;

determining, if the first index value is an odd number and the candidate motion information corresponding to the first index value includes unidirectional motion information corresponding to list1, the unidirectional motion information corresponding to list1 as the first target motion information of the first triangle sub-block;

determining, if the first index value is an odd number and the candidate motion information corresponding to the first index value does not include unidirectional motion information corresponding to list1, the unidirectional motion information corresponding to list0 as the first target motion information of the first triangle sub-block;

acquiring candidate motion information corresponding to the second index value from the motion information list, and determining the acquired candidate motion information corresponding to the second index value as the second target motion information of the second triangle sub-block includes:

determining, if the second index value is an even number and the candidate motion information corresponding to the second index value includes unidirectional motion information corresponding to list0, the unidirectional motion information corresponding to list0 as the second target motion information of the second triangle sub-block;

determining, if the second index value is an even number and the candidate motion information corresponding to the second index value does not include unidirectional motion information corresponding to list0, the unidirectional motion information corresponding to list1 as the second target motion information of the second triangle sub-block;

determining, if the second index value is an odd number and the candidate motion information corresponding to the second index value includes unidirectional motion information corresponding to list1, the unidirectional motion information corresponding to list1 as the second target motion information of the second triangle sub-block;

determining, if the second index value is an odd number and the candidate motion information corresponding to the second index value does not include unidirectional motion information corresponding to list1, the unidirectional motion information corresponding to list0 as the second target motion information of the second triangle sub-block.

The acquisition module 83 is further configured for: acquiring a first candidate set and a second candidate set, wherein the first candidate set includes parts of candidate motion information in the motion information list, the second candidate set includes parts of candidate motion information in the motion information list, and the candidate motion information in the first candidate set is not exactly the same as the candidate motion information in the second candidate set; acquiring candidate motion information corresponding to the first index value from the first candidate set, and determining the acquired candidate motion information corresponding to the first index value as the first target motion information of the first triangle sub-block; and acquiring candidate motion information corresponding to the second index value from the second candidate set, and determining the acquired candidate motion information corresponding to the second index value as the second target motion information of the second triangle sub-block.

The apparatus further includes: a storing module, configured for storing first target motion information for a sub-block in the first triangle sub-block, on which non-weighted prediction compensation is performed; storing second target motion information for a sub-block in the second triangle sub-block, on which non-weighted prediction compensation is performed; storing first target motion information, second target motion information or bidirectional motion information for a sub-block, on which weighted prediction compensation is performed.

For storing first target motion information, second target motion information or bidirectional motion information for a sub-block, on which weighted prediction compensation is performed, the storing module is specifically configured for:

storing first target motion information for the sub-block; or storing second target motion information for the sub-block; or storing first target motion information or second target motion information for the sub-block according to the position of the sub-block; or storing first target motion information or second target motion information for the sub-block according to the division direction of the current block; or storing first target motion information or second target motion information for the sub-block according to the position of the sub-block and the division direction of the current block.

For storing first target motion information, second target motion information or bidirectional motion information for a sub-block, on which weighted prediction compensation is performed, the storing module is specifically configured for:

merging, if the first target motion information and the second target motion information are derived from different lists, the first target motion information and the second target motion information into bidirectional motion information, and storing the bidirectional motion information for the sub-block;

storing, if the first target motion information and the second target motion information are derived from the same list, the first target motion information or the second target motion information for the sub-block.

For storing the first target motion information or the second target motion information for the sub-block, the storing module is specifically configured for:

storing the first target motion information for the sub-block; or storing the second target motion information for the sub-block; or storing first target motion information or second target motion information for the sub-block according to the position of the sub-block; or storing first target motion information or second target motion information for the sub-block according to the division direction of the current block; or storing first target motion information or second target motion information for the sub-block according to the position of the sub-block and the division direction of the current block; or storing first target motion information and second target motion information for the sub-block; or storing first target motion information or second target motion information for the sub-block based on the size information of the current block.

Figure 9A:
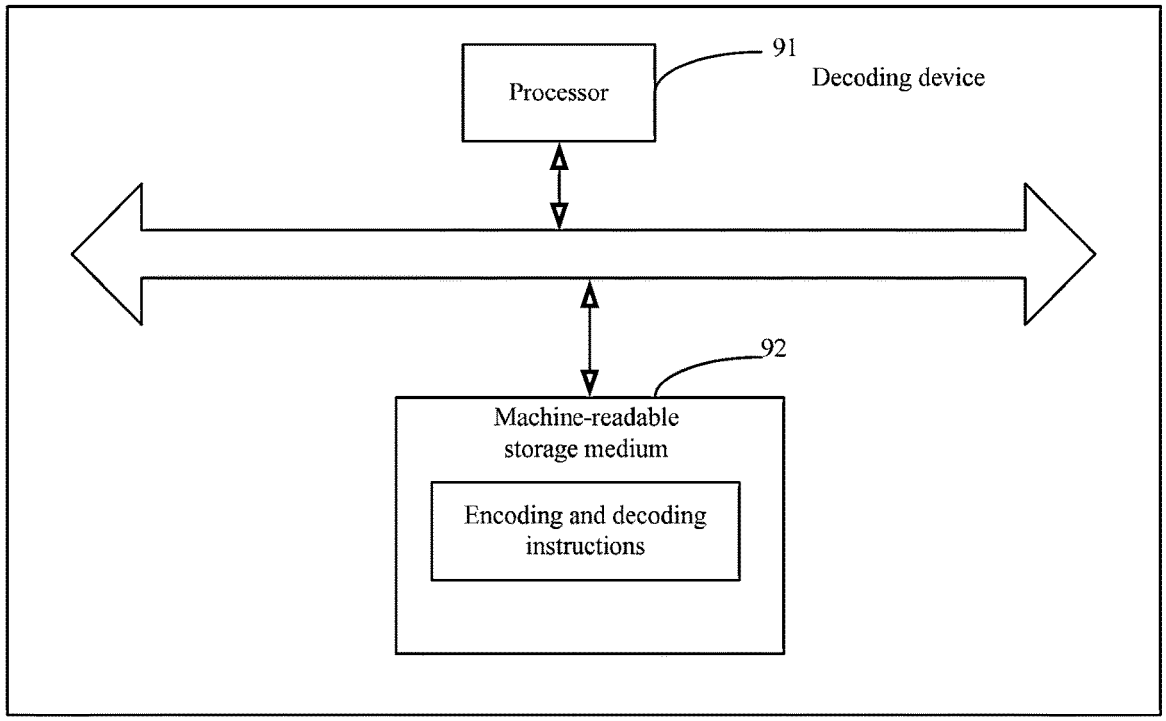
FIG. 9A is a hardware structural diagram of a decoding device according to an embodiment of the present application.

From the hardware level of the decoding device provided by the embodiment of the present application, the schematic diagram of its hardware architecture may be specifically referred to as shown in FIG. 9A. It includes: a processor 91 and a machine-readable storage medium 92, wherein: the machine-readable storage medium 92 stores machine executable instructions that may be executed by the processor 91; the processor 91 is used to execute the machine executable instructions to implement the method disclosed in the above examples of the present application. For example, the processor 91 is configured for executing the machine-executable instructions to implement the following steps: dividing, if characteristic information of a current block meets specific conditions, the current block into a first triangle sub-block and a second triangle sub-block; constructing a motion information list for the current block, wherein the motion information list includes multiple pieces of candidate motion information; acquiring first target motion information of the first triangle sub-block and the second target motion information of the second triangle sub-block from the motion information list, wherein the first target motion information is different with the second target motion information; performing motion compensation on the first triangle sub-block based on the first target motion information, to obtain a prediction value of the first triangle sub-block; and performing motion compensation on the second triangle sub-block based on the second target motion information, to obtain a prediction value of the second triangle sub-block.

Figure 9B:
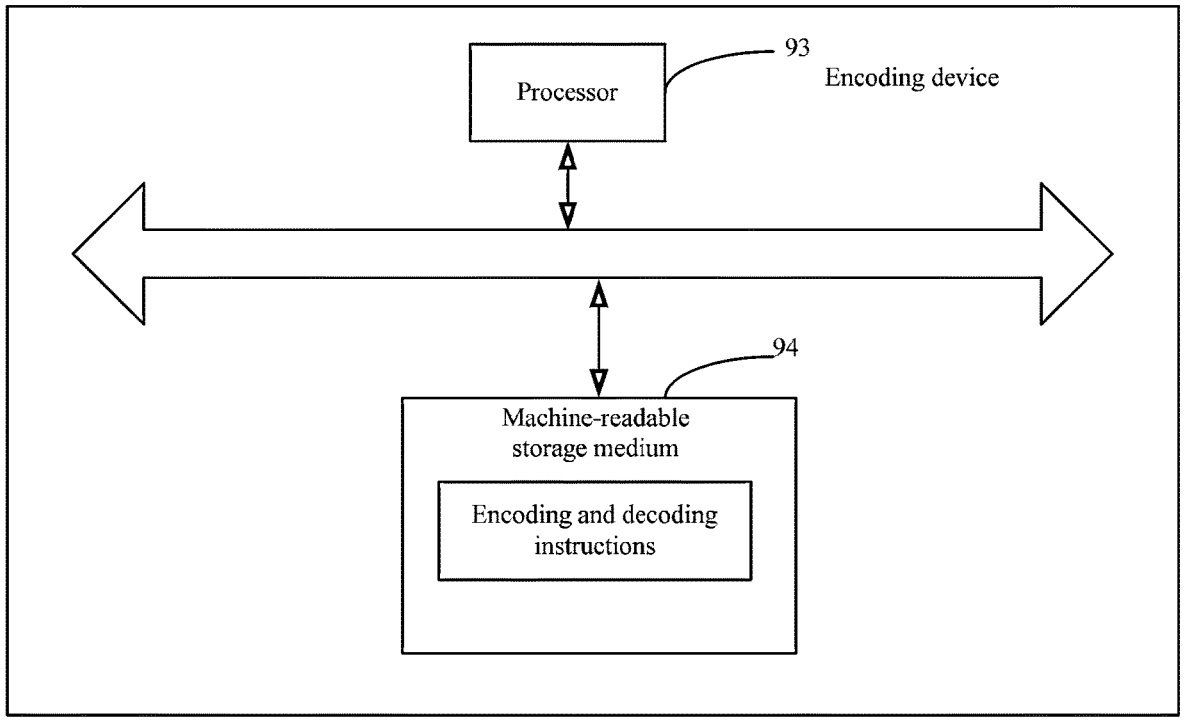
FIG. 9B is a hardware structural diagram of an encoding device according to an embodiment of the present application.

From the hardware level of the encoding device provided by the embodiment of the present application, the schematic diagram of its hardware architecture may be specifically referred to as shown in FIG. 9B. It includes: a processor 93 and a machine-readable storage medium 94, wherein: the machine-readable storage medium 94 stores machine executable instructions that may be executed by the processor 93; the processor 93 is used to execute the machine executable instructions to implement the method disclosed in the above examples of the present application. For example, the processor 93 is configured for executing the machine-executable instructions to implement the following steps: dividing, if characteristic information of a current block meets specific conditions, the current block into a first triangle sub-block and a second triangle sub-block; constructing a motion information list for the current block, wherein the motion information list includes multiple pieces of candidate motion information; acquiring first target motion information of the first triangle sub-block and the second target motion information of the second triangle sub-block from the motion information list, wherein the first target motion information is different with the second target motion information; performing motion compensation on the first triangle sub-block based on the first target motion information, to obtain a prediction value of the first triangle sub-block; and performing motion compensation on the second triangle sub-block based on the second target motion information, to obtain a prediction value of the second triangle sub-block.

Based on the same application concept as the above method, an embodiment of the present application also provides a machine-readable storage medium, several computer instructions are stored on the machine-readable storage medium. The computer instructions may implement the encoding and decoding method disclosed in the above examples when being executed by the processor. Wherein the machine-readable storage medium may be any electronic, magnetic, optical, or other physical storage system that may contain or store information such as executable instructions, data, and the like. For example, the machine-readable storage medium may be: RAM (Radom Access Memory), volatile memory, non-volatile memory, flash memory, storage drive (such as a hard disk drive), solid state disk, any type of storage disk (such as a disc, dvd, etc.), or a similar storage medium, or a combination thereof.

The system, device, module or unit described in the above embodiments may be implemented by a computer chip or entity, or by a product with a certain function. A typical implementation device is computer. The specific form of computer may be personal computer, laptop computer, cellular phone, camera phone, smart phone, personal digital assistant, media player, navigation device, e-mail transceiver, tablet computer, wearable device or any combination of these devices.

For the convenience of description, the above devices are divided into various units according to functions for describing. Of course, the functions of each unit may be realized in one or more software and/or hardware when implementing the present application. Those skilled in the art will appreciate that embodiments of the present application may be provided as a method, system, or computer program product. Thus, the present application may take the form of an entirely hardware embodiment, an entirely software embodiment or an embodiment in combination of software and hardware. Moreover, the embodiment of the present application may take the form of a computer program product implemented on one or more computer-usable storage media (including but not limited to disk storage, CD-ROM, optical storage, etc.) including computer usable program code.

The present application is described with reference to a flow chart and/or block diagram of a method, device (system), and computer program product according to an embodiment of the present application. It should be understood that each flow and/or block in a flow chart and/or block diagram and the combination of the flow and/or block in a flow chart and/or block diagram may be implemented by computer program instructions. These computer program instructions may be provided to a processor of a general purpose computer, a dedicated computer, an embedded processor or other programmable data processing device to generate a machine such that instructions executed by a processor of a computer or other programmable data processing device generate an apparatus implementing the functions specified in one process or multiple processes in the flow chart and/or one block or multiple blocks in the block diagram.

These computer program instructions may also be loaded onto a computer or other programmable data processing device such that a series of operation steps are performed on the computer or other programmable device to produce a computer implemented process, so that the instructions executed on the computer or other programmable device provide steps for implementing the functions specified in one process or multiple processes in the flow chart and/or one block or multiple blocks in the block diagram. The embodiments described above are merely embodiments of the present application, and not intended to limit the present application. Various modifications and changes may be made to the present application by those skilled in the art. Any modifications, equivalents, improvements or the like within the spirit and principle of the application should be included in the scope of the application.

What is claimed is:

1. A decoding method, comprising:
acquiring first target motion information and second target motion information; wherein the first target motion information is target motion information of a first sub-block divided from a current block, and the second target motion information is target motion information of a second sub-block divided from the current block; wherein the first sub-block and the second sub-block are two triangle sub-blocks divided from the current block according to a partition line;
determining a first area, a second area and a third area included in the current block based on the first sub-block and the second sub-block divided according to the partition line, wherein the first area is located in the first sub-block, the second area is located in the second sub-block, the partition line is located in the third area;
storing the first target motion information as the target motion information of a sub-block in the first area, wherein the sub-block in the first area is a sub-block on which non-weighted prediction compensation is performed;
storing the second target motion information as the target motion information of a sub-block in the second area, wherein the sub-block in the second area is a sub-block on which non-weighted prediction compensation is performed;
if the first target motion information and the second target motion information are derived from a same reference frame list, storing the second target motion information as target motion information of the third area, and
if the first target motion information and the second target motion information are derived from different reference frame lists, merging the first target motion information and the second target motion information into bidirectional motion information, which then is stored as the target motion information of the third area.

2. The method of claim 1, wherein, the motion information is stored in a unit of a 4*4 block.

3. The method of claim 1, wherein, after determining a first area, a second area, and a third area included in a current block based on the first sub-block and the second sub-block divided according to the partition line, the method further comprises:
performing motion compensation on each sub-block in the first area based on the first target motion information, to obtain a prediction value of each sub-block in the first area;

performing motion compensation on each sub-block in the second area based on the second target motion information, to obtain a prediction value of each sub-block in the second area;

performing weighted motion compensation on each sub-block in the third area based on the first target motion information and the second target motion information, to obtain a prediction value of each sub-block in the third area;

determining a prediction value of the current block based on the prediction value of each sub-block in the first area, the prediction value of each sub-block in the second area, and the prediction value of each sub-block in the third area;

wherein, performing weighted motion compensation on each sub-block in the third area based on the first target motion information and the second target motion information, to obtain a prediction value of each sub-block in the third area comprises:

for each sub-block in the third area, determining a first prediction value of the sub-block based on the first target motion information, and determining a second prediction value of the sub-block based on the second target motion information;

performing weighted motion compensation on the sub-block based on the first prediction value, a first weight coefficient corresponding to the first prediction value, the second prediction value, a second weight coefficient corresponding to the second prediction value, to obtain the prediction value of the sub-block.

4. The method of claim 3, wherein,
if the sub-block in the third area is located in the first sub-block, the first weight coefficient corresponding to the first prediction value of the sub-block is greater than the second weight coefficient corresponding to the second prediction value of the sub-block;
if the sub-block in the third area is located in the second sub-block, the first weight coefficient corresponding to the first prediction value of the sub-block is smaller than the second weight coefficient corresponding to the second prediction value of the sub-block;
if the sub-block in the third area is located across the partition line, the first weight coefficient corresponding to the first prediction value of the sub-block is equal to the second weight coefficient corresponding to the second prediction value of the sub-block.

5. The method of claim 1, wherein, acquiring first target motion information and second target motion information comprises:
constructing a motion information list for the current block, wherein the motion information list includes multiple pieces of candidate motion information;
acquiring first target motion information of the first sub-block and the second target motion information of the second sub-block from the motion information list;
or wherein, the first target motion information is different from the second target motion information.

6. The method of claim 1, wherein, acquiring first target motion information and second target motion information comprises:
constructing a motion information list for the current block, wherein the motion information list includes multiple pieces of candidate motion information;
selecting one piece of candidate motion information corresponding to the first index value from the motion information list based on a first index value indicated by indication information, and determining the candidate motion information as the first target motion information;
selecting another piece of candidate motion information corresponding to the second index value from the motion information list based on a second index value indicated by indication information, and determining this candidate motion information as the second target motion information.

7. The method of claim 1, wherein, the steps in claim 1 are performed when a motion information mode of the current block, size information of the current block, a slice type of a current slice and sequence-level switch control information of the current block meet specific conditions; wherein the motion information mode of the current block meeting the specific condition comprises that the motion information mode of the current block is a merge mode, and the motion information mode of the current block is not a regular merge mode, a sub-block-based merge mode or a combined inter-picture merge and intra-picture prediction mode; and wherein the slice type of the current slice meeting the specific condition comprises that the current slice where the current block is located is a B slice.

8. The method of claim 3, wherein, if the first prediction value is P1, the second prediction value is P2, the first weight coefficient is a, the second weight coefficient is b, then a prediction value after weighted motion compensation of the sub-block is P1*a+P2*b; a value set of the first weight coefficient is {7/8, 6/8, 5/8, 4/8, 3/8, 2/8, 1/8}, and a sum of the first weight coefficient and the second weight coefficient is 1;
wherein, each sub-block in the third area comprises a luma component, and the set of weight coefficients for the brightness component is {7/8, 6/8, 5/8, 4/8, 3/8, 2/8, 1/8};
for any one brightness component, the first prediction value is a brightness prediction value determined based on the first target motion information, the second prediction value is a brightness prediction value determined based on the second target motion information, the prediction value after weighted motion compensation of the sub-block is a brightness prediction value after weighted motion compensation determined based on the first prediction value, the second prediction value, the first weight coefficient and the second weight coefficient.

9. The method of claim 8, wherein, each sub-block in the third area comprises a chroma component, for the chroma component, the first prediction value is a chroma prediction value determined based on the first target motion information, the second prediction value is a chroma prediction value determined based on the second target motion information, the prediction value after weighted motion compensation of the sub-block is a chroma prediction value after weighted motion compensation determined based on the first prediction value, the second prediction value, the first weight coefficient and the second weight coefficient.

10. The method of claim 1, wherein the two triangle sub-blocks are two triangle sub-blocks divided from the current block according to a partition method indicated by indication information.

11. An decoding device, comprising: a processor and a machine-readable storage medium, wherein the machine-readable storage medium stores machine executable instructions that are able to be executed by the processor;

the processor is configured to execute operations of:

acquiring first target motion information and second target motion information; wherein the first target motion information is target motion information of a first sub-block divided from a current block, and the second target motion information is target motion information of a second sub-block divided from the current block; wherein the first sub-block and the second sub-block are two triangle sub-blocks divided from the current block according to a partition line;

determining a first area, a second area and a third area included in the current block based on the first sub-block and the second sub-block divided according to the partition line, wherein the first area is located in the first sub-block, the second area is located in the second sub-block, the partition line is located in the third area;

storing the first target motion information as the target motion information of a sub-block in the first area, wherein the sub-block in the first area is a sub-block on which non-weighted prediction compensation is performed;

storing the second target motion information as the target motion information of a sub-block in the second area, wherein the sub-block in the second area is a sub-block on which non-weighted prediction compensation is performed;

if the first target motion information and the second target motion information are derived from a same reference frame list, storing the second target motion information as target motion information of the third area, and if the first target motion information and the second target motion information are derived from different reference frame lists, merging the first target motion information and the second target motion information into bidirectional motion information, which then is stored as the target motion information of the third area.

12. An electronic device, comprising:
a processor; and
a memory for storing processor executable instructions;
wherein the processor is configured to implement operations of:

acquiring first target motion information and second target motion information; wherein the first target motion information is target motion information of a first sub-block divided from a current block, and the second target motion information is target motion information of a second sub-block divided from the current block; wherein the first sub-block and the second sub-block are two triangle sub-blocks divided from the current block according to a partition line;

determining a first area, a second area and a third area included in the current block based on the first sub-block and the second sub-block divided according to the partition line, wherein the first area is located in the first sub-block, the second area is located in the second sub-block, the partition line is located in the third area;

storing the first target motion information as the target motion information of a sub-block in the first area, wherein the sub-block in the first area is a sub-block on which non-weighted prediction compensation is performed;

storing the second target motion information as the target motion information of a sub-block in the second area, wherein the sub-block in the second area is a sub-block on which non-weighted prediction compensation is performed;

if the first target motion information and the second target motion information are derived from a same reference frame list, storing the second target motion information as target motion information of the third area, and if the first target motion information and the second target motion information are derived from different reference frame lists, merging the first target motion information and the second target motion information into bidirectional motion information, which then is stored as the target motion information of the third area.

13. A non-transitory storage medium on which instructions are stored, wherein the instructions implement following operations when being executed by a processor:

acquiring first target motion information and second target motion information; wherein the first target motion information is target motion information of a first sub-block divided from a current block, and the second target motion information is target motion information of a second sub-block divided from the current block; wherein the first sub-block and the second sub-block are two triangle sub-blocks divided from the current block according to a partition line;

determining a first area, a second area and a third area included in the current block based on the first sub-block and the second sub-block divided according to the partition line, wherein the first area is located in the first sub-block, the second area is located in the second sub-block, the partition line is located in the third area;

storing the first target motion information as the target motion information of a sub-block in the first area, wherein the sub-block in the first area is a sub-block on which non-weighted prediction compensation is performed;

storing the second target motion information as the target motion information of a sub-block in the second area, wherein the sub-block in the second area is a sub-block on which non-weighted prediction compensation is performed;

if the first target motion information and the second target motion information are derived from a same reference frame list, storing the second target motion information as target motion information of the third area, and if the first target motion information and the second target motion information are derived from different reference frame lists, merging the first target motion information and the second target motion information into bidirectional motion information, which then is stored as the target motion information of the third area.

* * * * *